Figure 1:
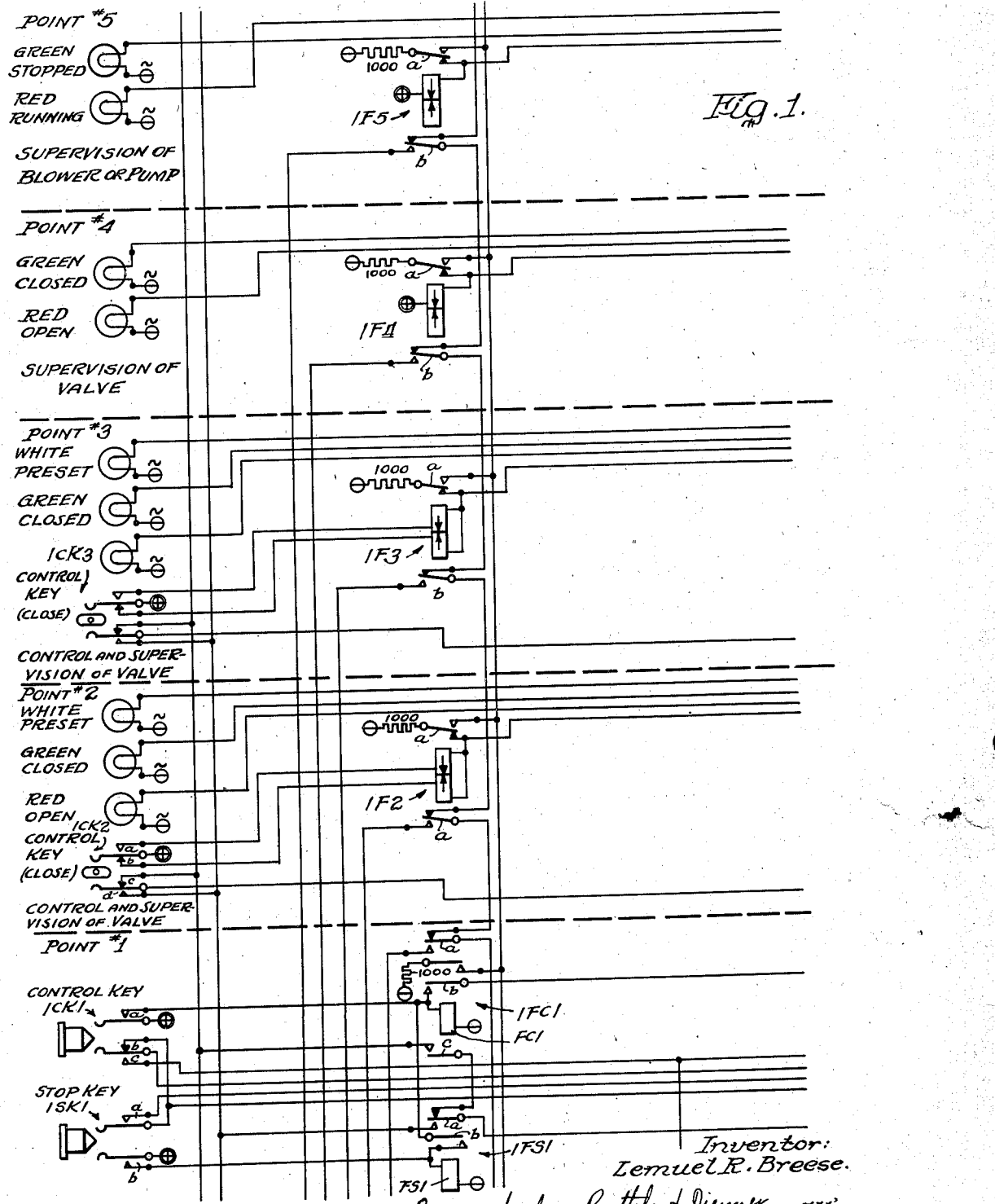
Figure 2:
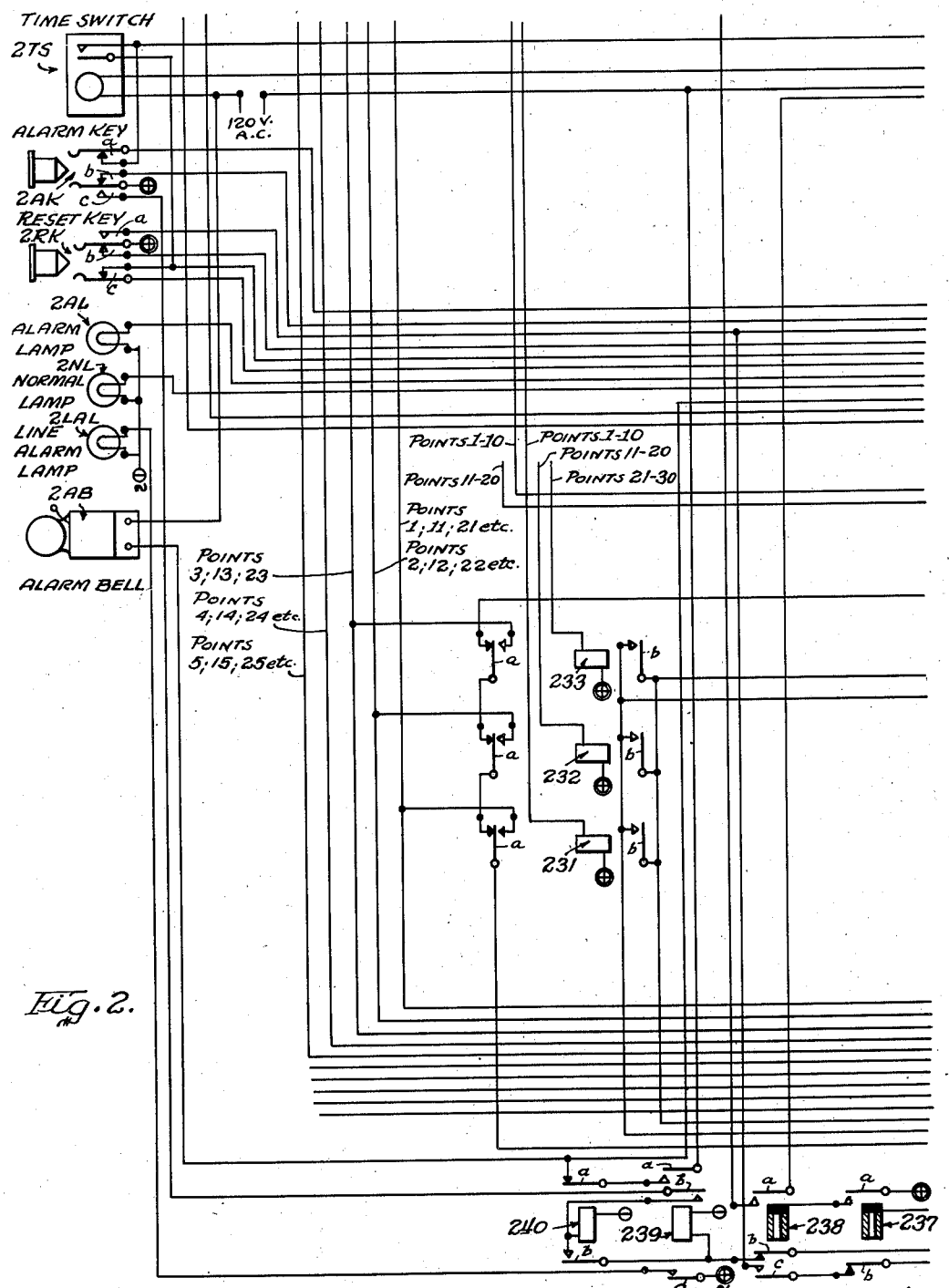
Figure 3:
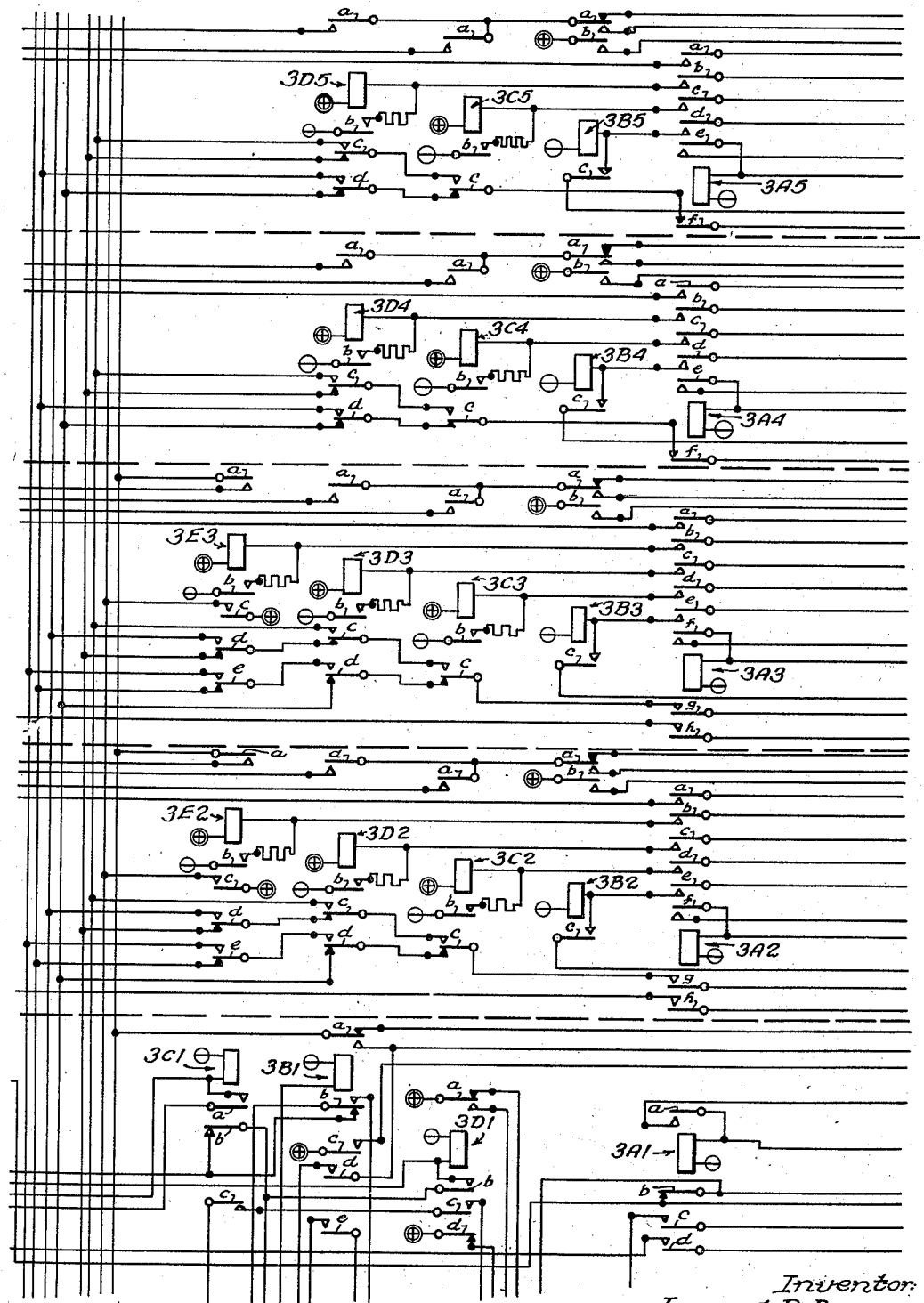
Figure 5:
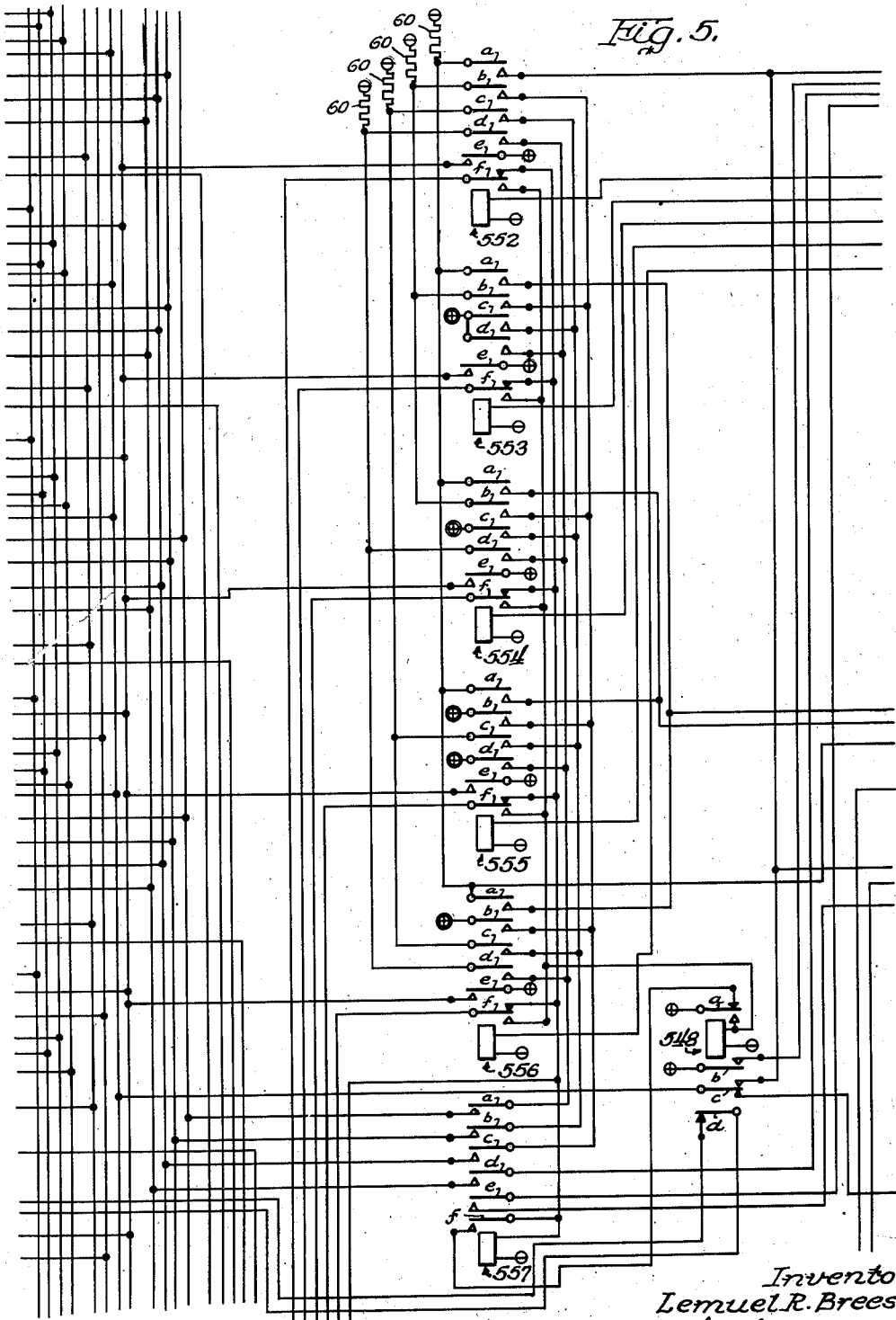
Figure 6:
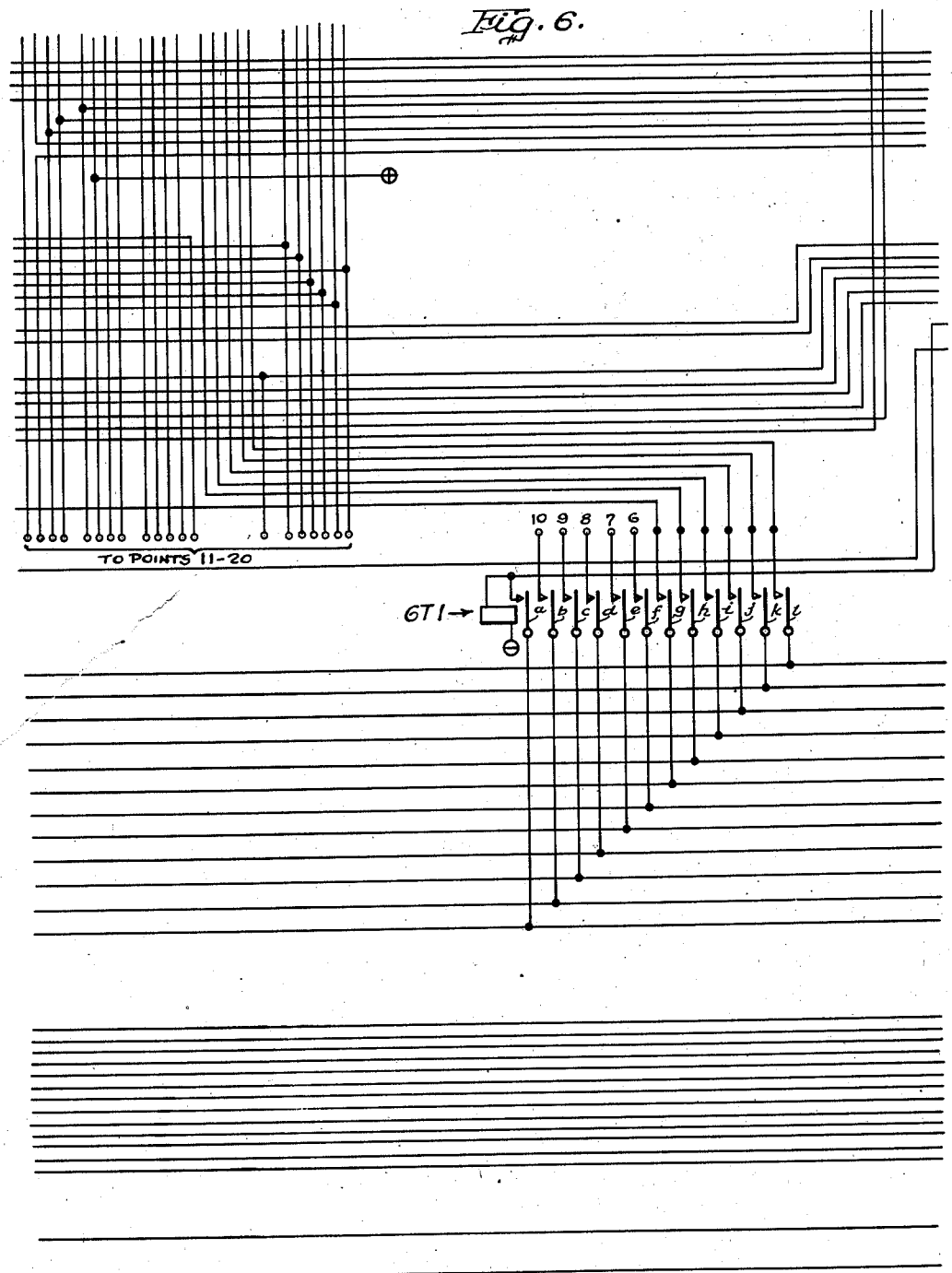
Figure 7:
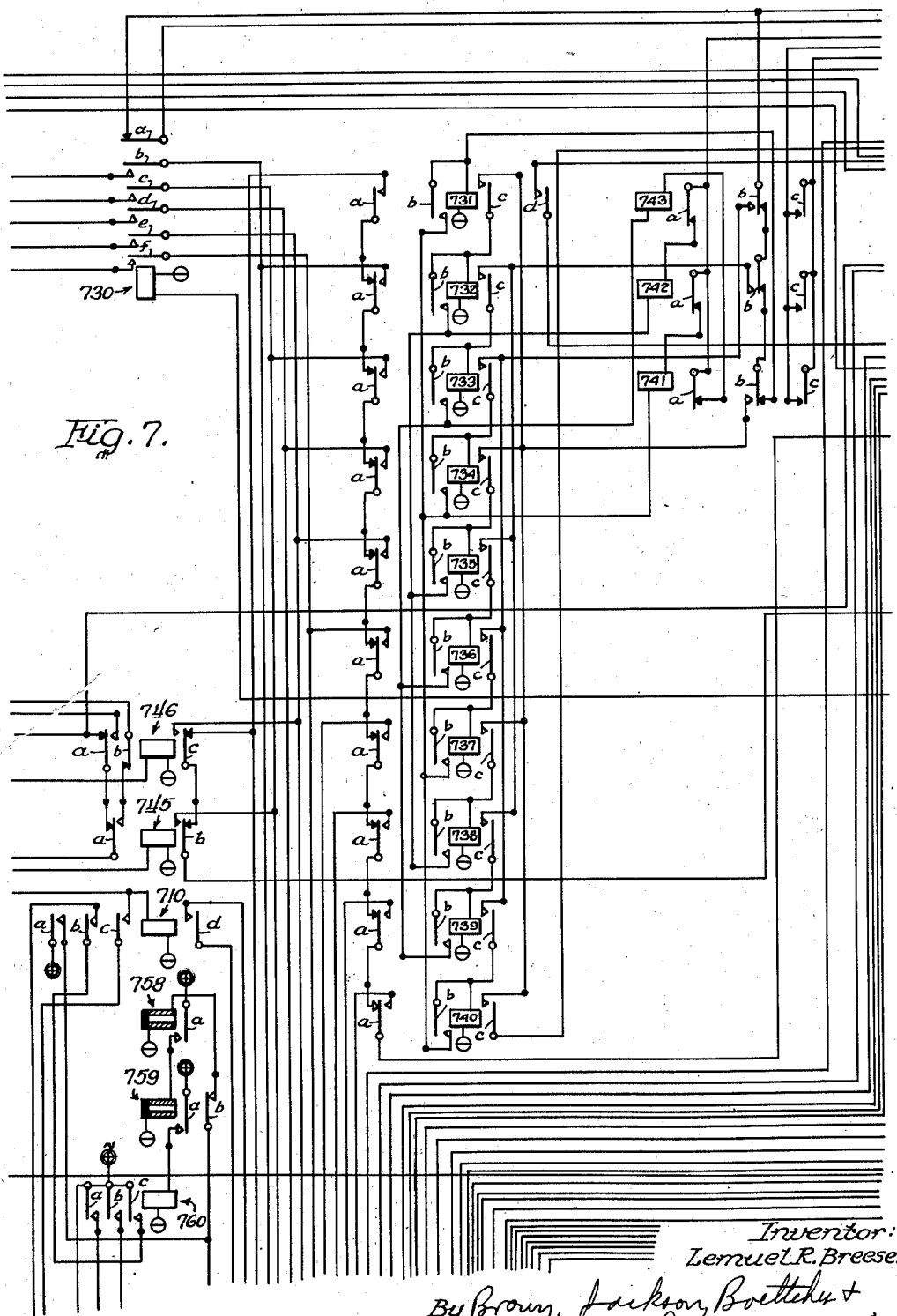
Figure 8:
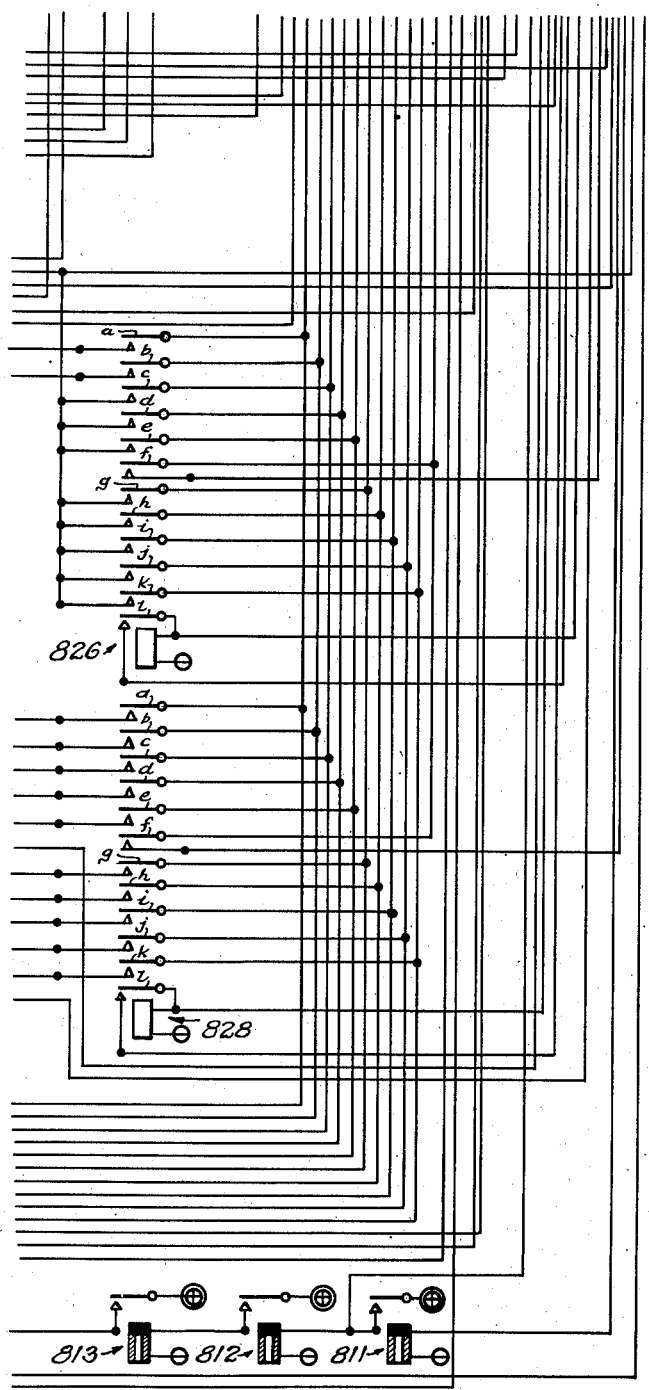
Figure 9:
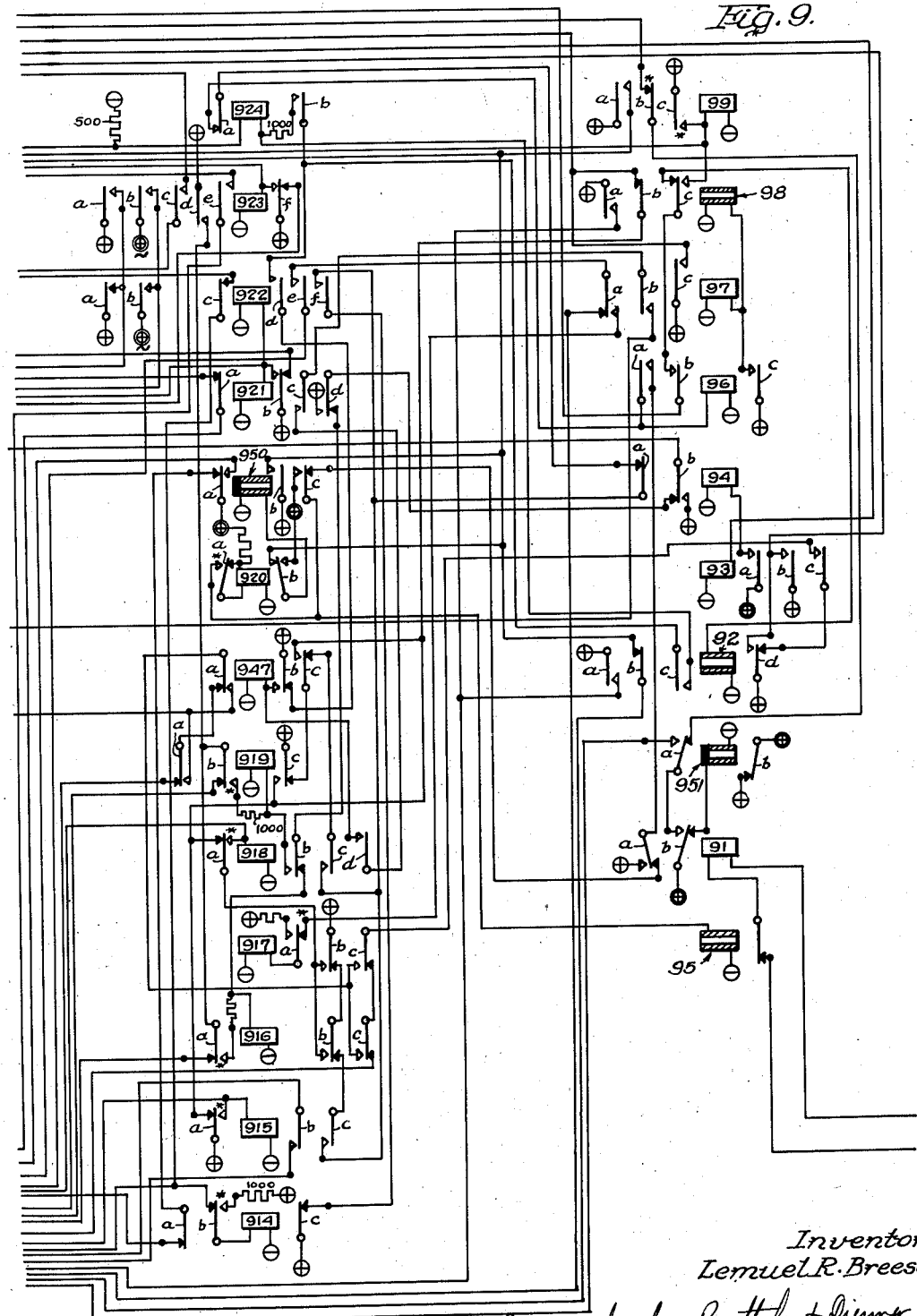
Figure 10:
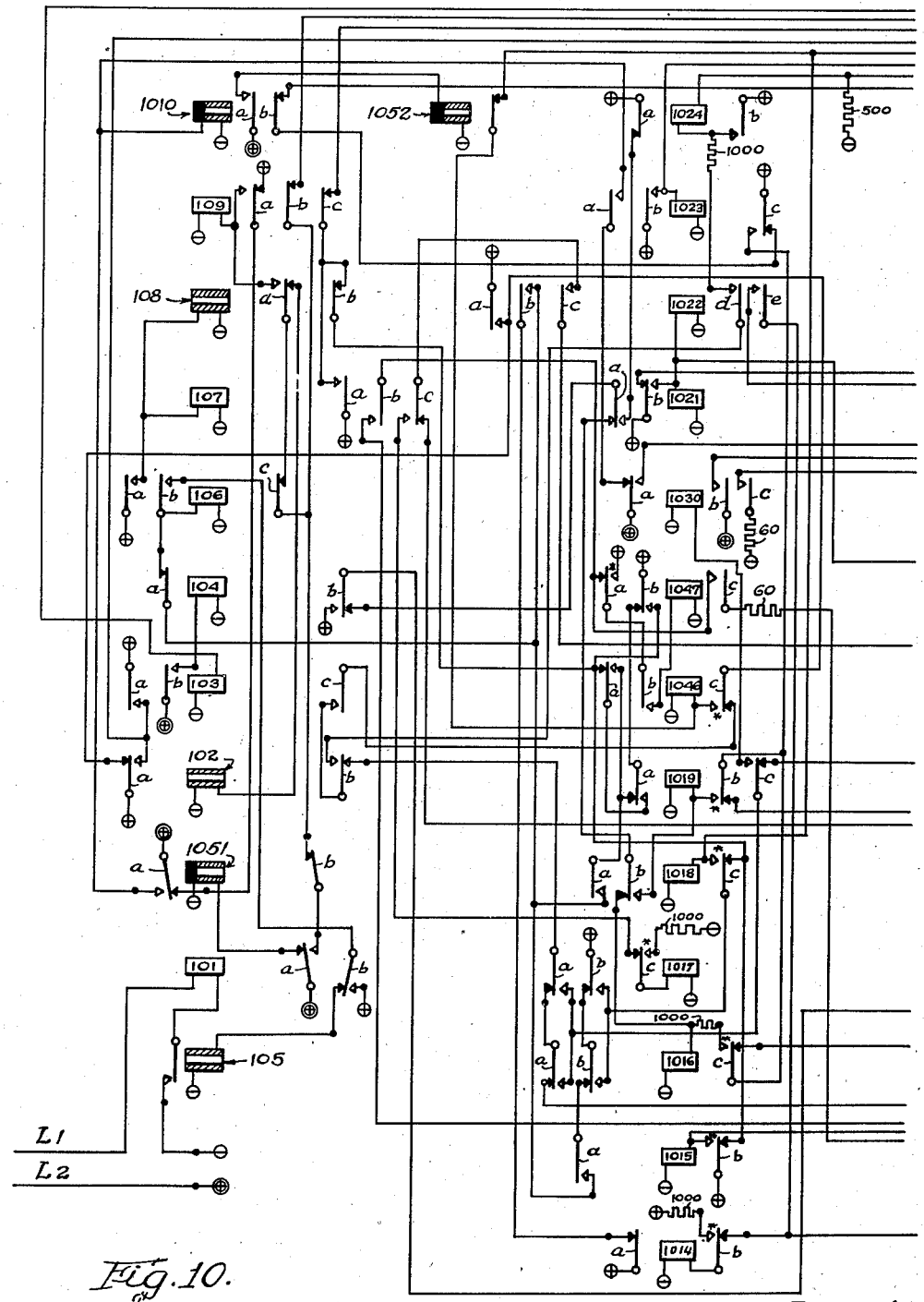

June 29, 1948.   L. R. BREESE   2,444,243
REMOTE CONTROL SYSTEM
Filed Aug. 7, 1946   14 Sheets-Sheet 1

Inventor:
Lemuel R. Breese.
By Brown, Jackson, Boettcher & Dienner   Attys.

June 29, 1948.   L. R. BREESE   2,444,243
REMOTE CONTROL SYSTEM
Filed Aug. 7, 1946   14 Sheets-Sheet 4
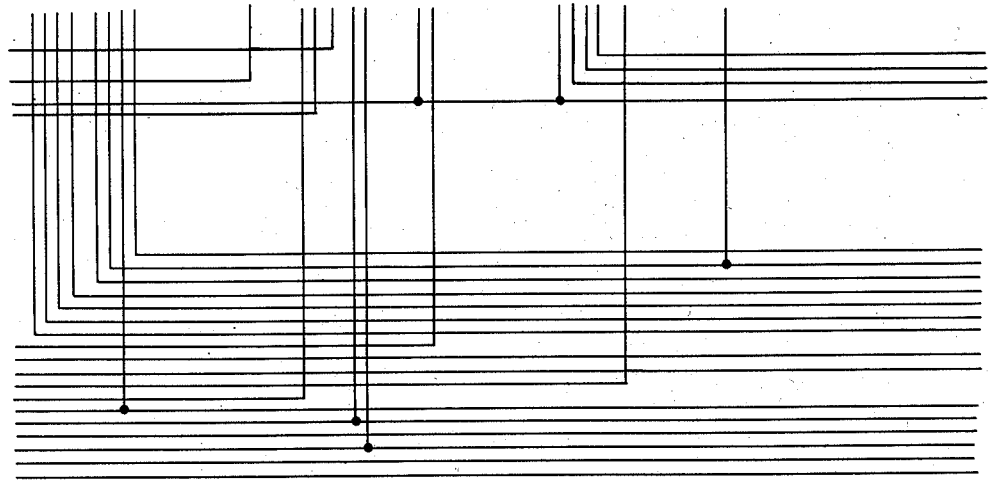
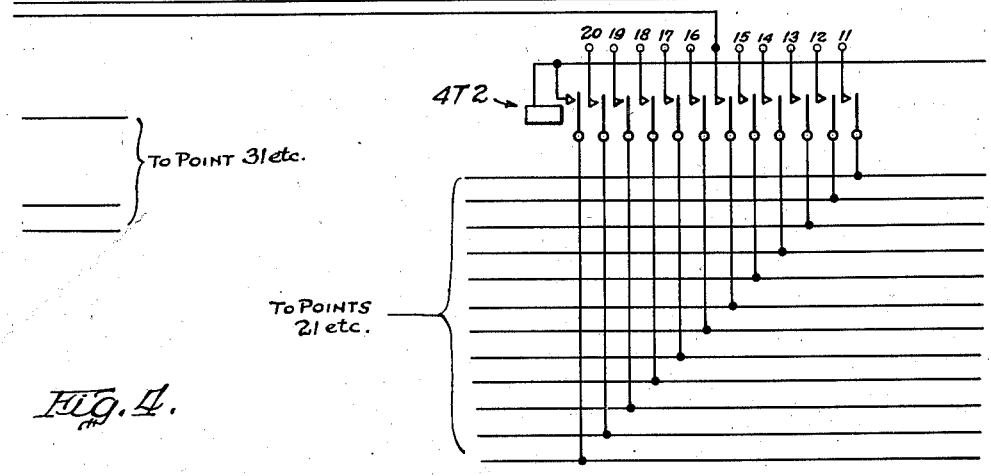
Fig. 4.
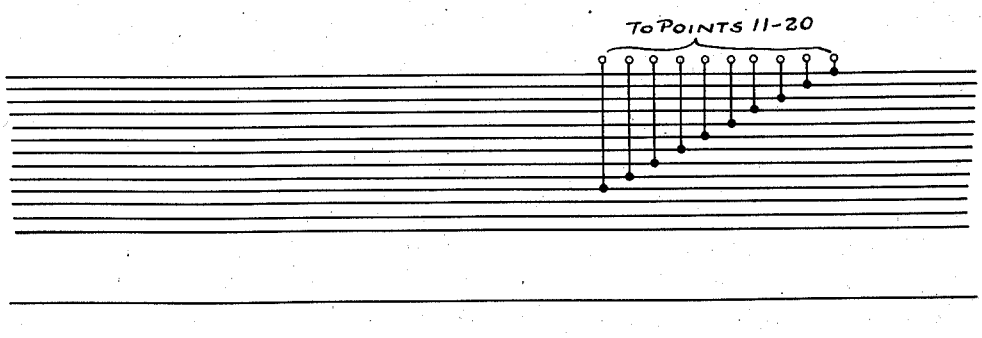
Inventor:
Lemuel R. Breese.
By Brown, Jackson, Boettcher & Dienner
Attys.

June 29, 1948.   L. R. BREESE   2,444,243
REMOTE CONTROL SYSTEM
Filed Aug. 7, 1946   14 Sheets-Sheet 9

Inventor:
Lemuel R. Breese
By Brown, Jackson, Boettcher & Dienner
Attys

June 29, 1948.   L. R. BREESE   2,444,243
REMOTE CONTROL SYSTEM
Filed Aug. 7, 1946   14 Sheets-Sheet 11

⊖ NEGATIVE –
   48 VOLT BATTERY
⊕ POSITIVE –
   48 VOLT BATTERY
⊕ POSITIVE – 48 VOLT
   BATTERY THROUGH b109a
⊚ 120 VOLT ALTERNATING
⊚ CURRENT SOURCE
✱ MAKE BEFORE BREAK
   CONTACTS

Inventor.
Lemuel R. Breese.
By Brown, Jackson, Boettcher & Dienner
Attys.

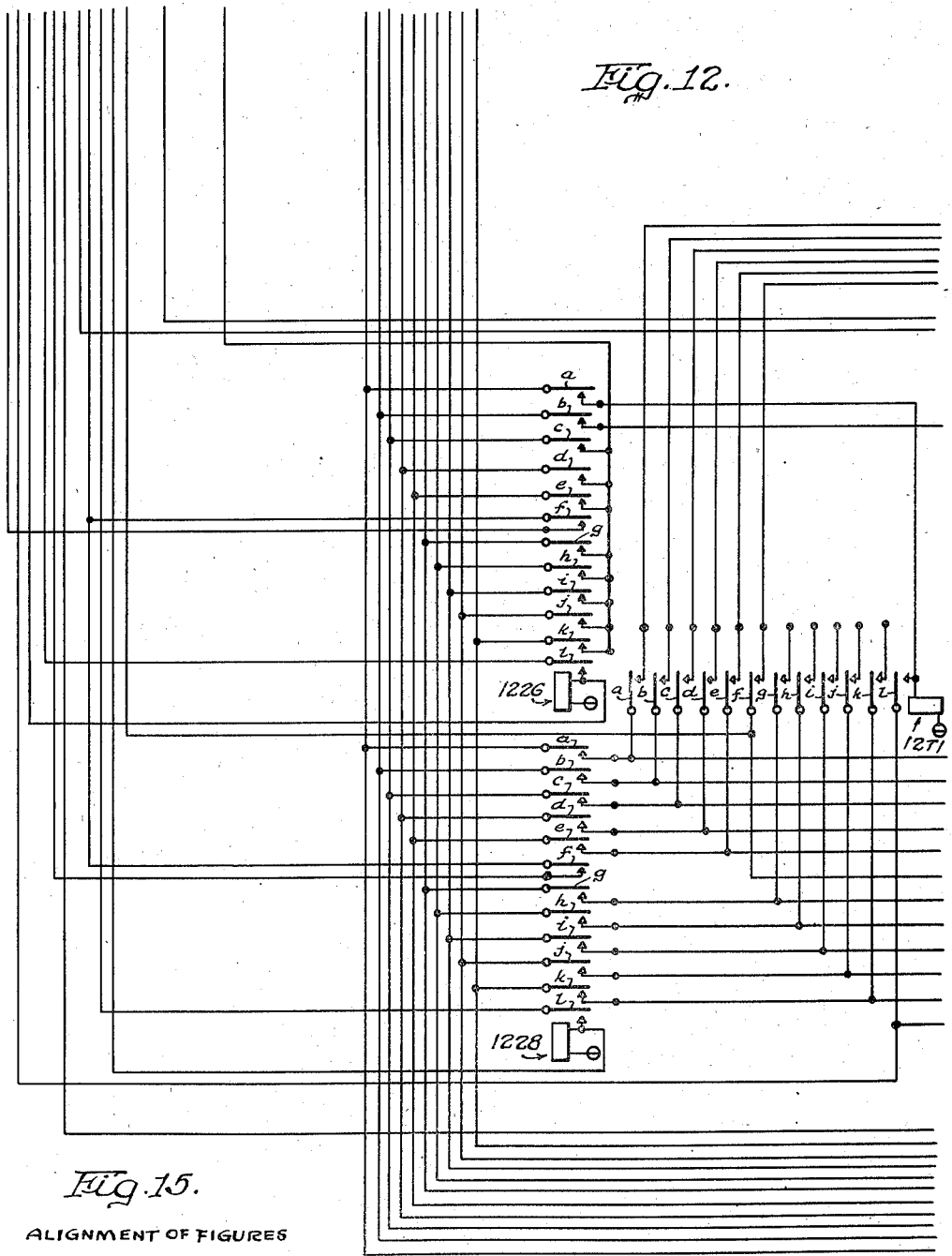

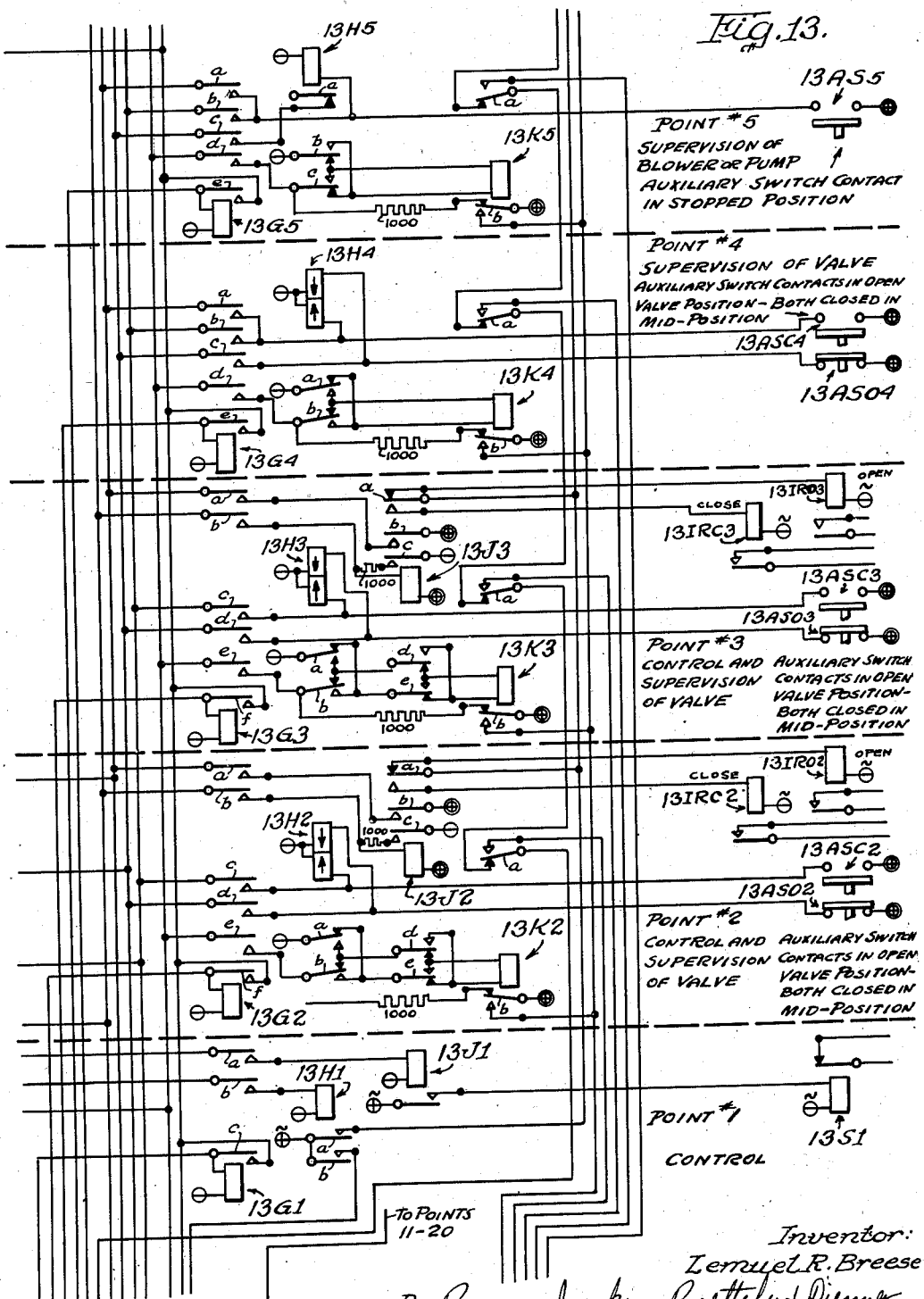

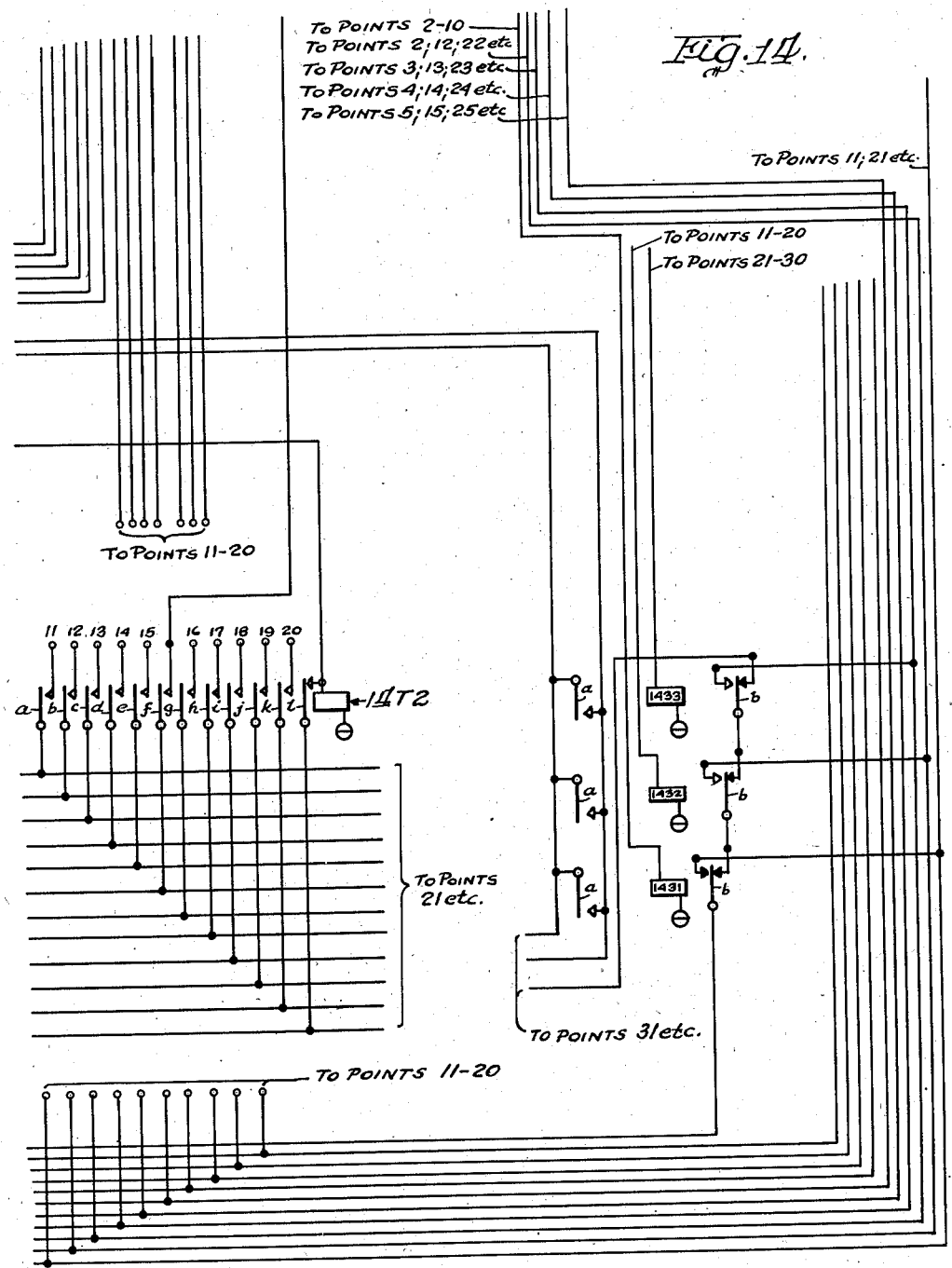

Patented June 29, 1948

2,444,243

UNITED STATES PATENT OFFICE 2,444,243

REMOTE-CONTROL SYSTEM

Lemuel R. Breese, Galion, Ohio, assignor to The North Electric Manufacturing Company, Galion, Ohio, a corporation of Ohio Application August 7, 1946, Serial No. 688,892

9 Claims. (Cl. 177—353)

This invention relates generally to remote control systems and it has particular relation to supervisory control systems wherein apparatus units at a remote location are controlled and/or supervised from a control location over a signalling circuit which may comprise a metallic circuit or may comprise a radio signalling and control channel.

The present invention employs certain parts of the supervisory control system described in Boswau Patents Nos. 2,059,204 and 2,091,301, assigned to the assignee of this application. These patents disclose supervisory control systems wherein counting chains are operated synchronously at control and remote locations, or at an office and sub-station over a single signalling channel comprising a single pair of conductors. Since these systems employ for the operation thereof various combinations of impulses without regard to their polarity, their use is not limited to a metallic circuit between the locations, but they may be used where the signalling and control channel comprises a radio circuit. While the present invention will be described in conjunction with a metallic circuit interconnecting the control location and the remote location, it will be understood that the invention may be practiced using a radio signalling and control channel interconnecting the locations.

Among the objects of my invention are: To effect simultaneous operation of a plurality of apparatus units, such as valves requiring a substantial time for operation, from one position to the other at a remote location from a control location over a supervisory control circuit, using synchronously operating relay chains at the locations, the supervisory control circuit being either a metallic circuit or a radio circuit; to indicate at the control location by indicating lamps the position of each apparatus unit, the lighting of the lamps being controlled as a result of the operation of the relay chains initiated at the remote location; to preset from the control location the apparatus units to operate from one position to the other; to indicate by a preset lamp at the control location after an apparatus unit has been preset to operate that the same has occurred; to indicate at the control location that each apparatus unit which has been preset to operate to the other position has started to move to such other position by lighting the indicating lamp corresponding to such other position while the other indicating lamp and the preset lamp remain lighted; to indicate at the control location that each apparatus unit has reached the other position by extinguishing the indicating lamp which corresponds to the previous position of the apparatus unit, and also the preset lamp; to provide an alarm at the control location which operates after any apparatus unit which was intended to have operated from one position to another does not do so within a predetermined interval; to indicate the particular apparatus unit which has not completed operation within the predetermined interval by flashing the preset lamp associated therewith, in addition to giving the alarm signal; to indicate at the control location if an apparatus unit at the remote location changes its position as a result of an operation originating at the remote location by flashing the indicating lamp corresponding to the new position of the apparatus unit and providing an alarm signal; to provide for stopping from the control location the operation of the apparatus units that have started to move to alternate positions; and to reset automatically the equipment in the event that an unduly long interval should elapse between various parts of the sequence of operations.

Other objects of my invention will, in part, be obvious, and in part appear hereinafter.

The functions of the supervisory control system disclosed herein and embodying my invention are to control the positioning of valves and supervise the position thereof as well as of pump contactors and blower contactors at a remote location. However, the invention is not limited to use in performing these particular functions. It may be employed for remotely controlling the operation of other apparatus such as electric power circuit breakers and switches for controlling the operation of various types of apparatus, the functioning of which it is desired to control remotely. As indicated hereinbefore, the apparatus in which the present invention is embodied is capable of functioning either over a circuit comprising a pair of wires or it can be operated over a radio channel. Codes of impulses similar to the impulses transmitted by the dial of an automatic telephone are sent over the signalling channel to effect control of the apparatus units or valves at the remote location and to operate the indicating lamps and alarm mechanism at the control location.

At the control location, there is a small escutcheon plate individual to each apparatus unit being controlled and/or supervised. On these plates are mounted the required indicating lamps and control keys. Telephone type supervisory control relays are employed at the control and remote locations for effecting the operation of the system.

At the control location, in addition to the escutcheon plates, each individual to an apparatus unit with the indicating lamps and control keys thereon, there are also provided common controls which comprise: An alarm key, reset key, an alarm lamp, a normal lamp, a line alarm lamp, a control key and a stop key.

On the escutcheon plates associated with the apparatus units that are controlled and supervised and also on the plates for the apparatus units that are supervised only, there are provided red and green indicating lamps. The red lamp is lighted whenever the apparatus unit, which is a valve, is open, or whenever the apparatus unit, which may be a pump or blower contactor, is closed. The green lamp is lighted whenever the apparatus unit, which is a valve, is closed, or if it is a pump or blower contactor, when it is open. Whenever one of the apparatus units, such as a valve or contactor, being supervised, changes position, an alarm bell rings and an alarm lamp flashes. If a valve has been opened or a contactor closed in response to an operation initiated at the remote location, the red lamp associated with that particular device also will flash. If the valve has been closed or a contactor opened under similar circumstances, the associated green lamp will flash. The operator can silence the alarm bell, turn off the alarm lamp and stop the flashing of the red or green indicating lamp by operating the alarm key.

On the escutcheon plates associated with apparatus units such as valves which are being controlled and supervised, there are mounted in addition to the red and green lamps a white preset lamp and a control key. The lamps indicate the apparatus unit or valve position as follows:

| Lamps Lighted | Position of the Valve |
| --- | --- |
| Green | Valve fully closed. |
| Red | Valve fully open. |
| Green and White | Valve closed and preset to be opened. |
| Red and White | Valve open and preset to be closed. |
| Red and Green | Valve moving to open or close position. |

The red and green indicating lamps at the control location always indicate the actual position of the valve regardless of whether it has been operated at the remote location or has been operated as a result of an operation initiated at the control location. After the valve is opened or closed by an operation initiated at the remote location, the alarm bell will ring and the alarm lamp will flash at the control location. The red and green indicating lamps associated with that particular valve will change to indicate its new position and will flash to indicate the particular valve which has changed its position. The operator at the control location can silence the alarm bell, turn off the alarm lamp and stop the flashing of the indicated lamp by operating the alarm key.

In order to preset a valve to move from one position to another the operator turns the control key on the escutcheon plate for that valve to open or closed position, as the case may be. The supervisory control equipment at the control location will then start to transmit the necessary codes to operate a preset relay at the remote location, corresponding to the valve selected. When the preset relay has been operated it will report back to the control location and cause the white preset lamp for the valve selected to light. When presetting several valves the operator can turn the control keys for the same in rapid succession. The supervisory control equipment will automatically select each valve in turn and operate its preset relay at the remote location to the selected position. After a valve has been preset, the operator can remove it from the preset condition by turning the control key back to the original position. The preset relay then will reset, and the white preset lamp corresponding thereto will be extinguished.

After the desired number of valves has been preset to operate to their opposite positions, it is desired to initiate operation thereof to their opposite positions so that their movements will take place simultaneously. That is, 15 valves, for example, may be preset to close and 25 valves may be preset to open. Obviously, other combinations of numbers of valves can be used, as circumstances dictate. In order to operate the valves simultaneously, it is only necessary to operate the control key at the control location. When this is done the necessary control impulses are transmitted from the control location to the remote location over the signalling channel by the synchronous operation of the relay chains. As the valves leave the previous positions, each reports to the control location over the signalling channel by the synchronous operation of the relay chains, resulting in the lighting of the indication lamp of each valve which corresponds to the position toward which it is moving, the other indicating lamp remaining lighted. Thus, while the valves are moving from one position to the other at the remote location, their red and green indicating lamps at the control location both are lighted. The white preset light associated with each valve being operated is also lighted. As each valve reaches its other position, it again reports to the control location to indicate that it has completed its travel. This is accomplished by extinguishing the white preset light and the indicating lamp corresponding to its previous position.

When the control key is operated, a timer is started which disconnects the alarm bell and alarm lamp at the control location, so that they will not be operated when the valves report in their changed positions as above outlined. The timer is so adjusted that the interval provided thereby is long enough to permit all of the valves to complete their travel and to report the same to the control location. For illustrative purposes it is pointed out that where it takes about sixty seconds for a valve to change from one position to another, the timer is set to measure an interval of about 110 seconds to permit the movement of the valves and the transmission of the reports on their new positions. When the timing interval is completed, the circuits to the alarm bell and the alarm lamp are restored.

If any valve, which has been preset, fails to operate when the control key is operated, or fails to complete its movement within the predetermined interval, the white preset lamp associated therewith will flash. This flashing will start as soon as the timing mechanism has restored the alarm circuit.

At any time during the interval that the valves are moving from one position to another, such movement can be arrested by the operator from the control location. To do this the operator operates the stop key. The operator can then cause any of the valves which he desires to return to their original positions, and others to complete their travel by operating the control keys therefor to the desired positions and waiting until the preset relays associated therewith all have operated; thereafter he operates the control key.

It is pointed out that whenever a valve control operation is performed, either the open or the closed interposing relay, i. e., the relay which is operated in response to receipt of an open or close code combination of impulses for effecting operation of the valve, will operate, depending upon the position of the preset relay for each valve. With respect to the valves which were not preset to operate, the open interposing relay will operate if the valve is already open and the close interposing relay will operate if it is already closed. Obviously, the operation of these relays will have no effect on the valve.

For a more complete understanding of the nature and scope of this invention, reference may be had to the following detailed description taken together with the accompanying drawings, in which:

Figures 1 through 9, taken together, illustrate diagrammatically the equipment which may be located at the control location and showing in detail the apparatus or apparatus units for points 1 through 5 of group 1, and indicating the connections for other groups and points or apparatus units therein;

Figures 10 through 14 illustrate diagrammatically the corresponding equipment at the remote location; and Figure 15 illustrates how the various figures of the drawings should be arranged in order to form a complete illustration of the system.

Explanation of reference characters

In order to identify the particular figure where a device is illustrated in the drawings, the first digit or digits of each of the reference characters signifies the particular figure where the device referred to will be found. Thus reference character 731 refers to counting chain relay 731, which will be found in Figure 7, and comprises the first relay of a relay chain comprising relays 731 through 740, whose sequence of operation is controlled in part by the relays 741, 742 and 743, all found in Figure 7. This relay chain is located at the control location.

Figure 11:
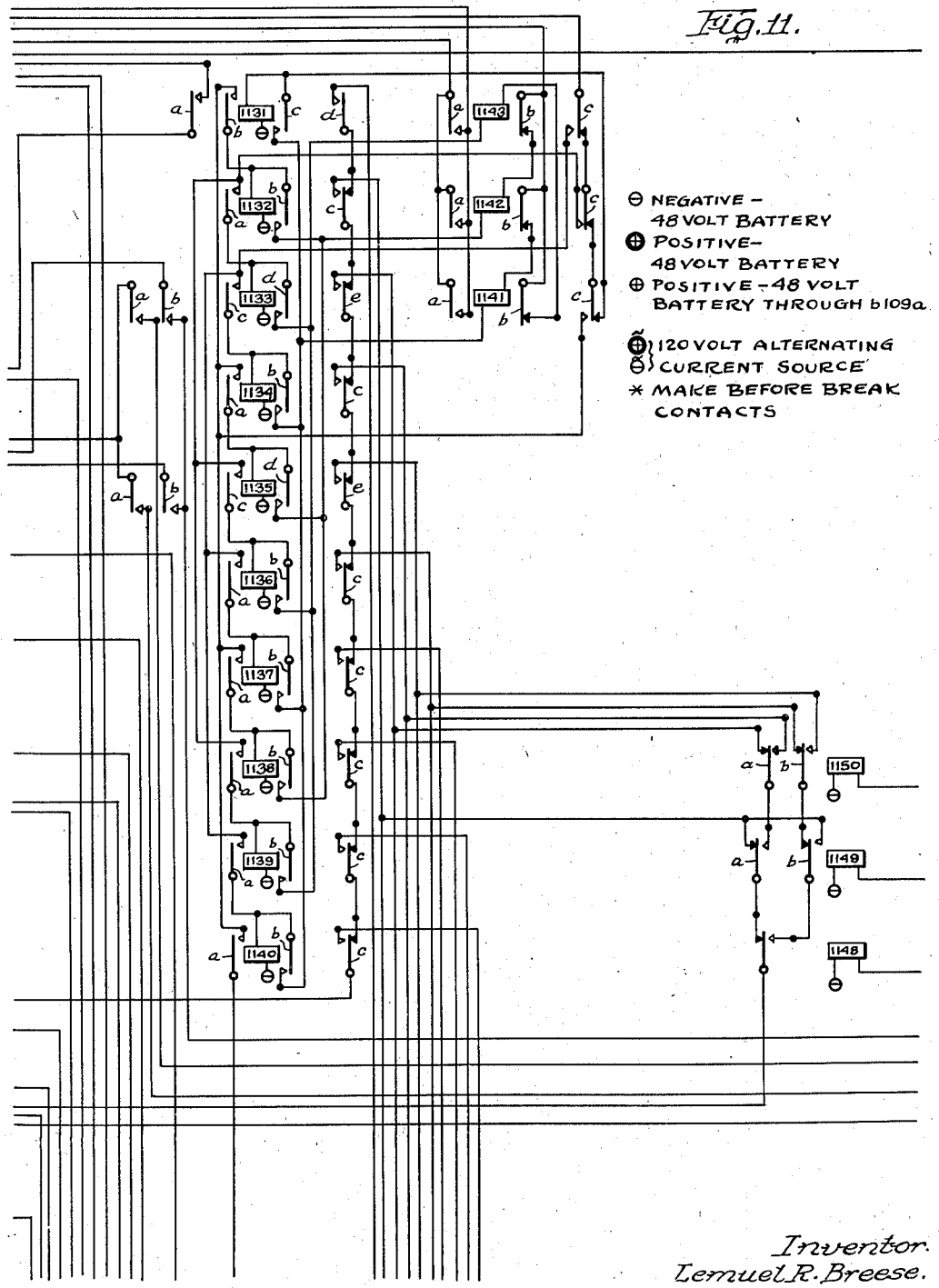

A corresponding counting chain at the remote location is illustrated in Figure 11 and comprises relays 1131 through 1140, which are controlled by relays 1141, 1142 and 1143.

Where a device is individual to an apparatus unit or point one or more capital letters are employed after the first digit or digits representing the number of the figure where the device is shown. In addition, the number of the point is next employed in the reference character. Thus, point selection relay at the control location for point No. 2 is designated as 3A2, the first digit representing Figure 3, the letter "A" representing the type of device and the last digit representing the point.

At the remote location the point selection relay for point No. 2 is indicated at 13G2. The first two digits represent the figure of the drawings where this relay is illustrated, the "G" indicating the type of relay, and the last digit representing the point with which it is associated.

The various relays are provided with make and/or break contacts, and these contacts are designated by small letters, $a$, $b$, $c$, etc., reading from left to right and top to bottom, as the case may be. For example, the upper contacts of lamp flashing control relay 3B3 may be indicated as 3B3$a$. It will be noted that these contacts are both make and break contacts. The break contacts are referred to herein as back contacts, while the make contacts are referred to as front contacts. Thus when relay 3B3 is deenergized, the break contacts may be represented as $b$3B3$a$. When this relay is energized, the make contacts are indicated as $f$3B3$a$. In a similar manner the contacts for supervision code control relay 1046 at the remote location may be designated. The left hand contacts may be indicated as 1046$a$. When this relay is deenergized, the break contacts are closed, and are represented by $b$1046$a$. When this relay is energized, these make contacts are closed, and are represented by $f$1046$a$.

Where only a make or a break contact is involved, the letter $b$ or $f$ is omitted. Likewise, using time delay relay 1052 for example, which has a single set of break contacts, they are referred to only by the reference character for the relay which also indicates the operating winding. It will be apparent that the context will make clear whether the reference character in this case refers to either the operating winding or the contacts of the relay.

Description of apparatus

For illustrative purposes, points 2 and 3 at the control and remote locations are shown in conjunction with supervision and control equipment. That is, the apparatus unit or valve associated with each of these points at the remote location can be controlled from the control location and also supervised. For these purposes each of these points is provided with a white preset lamp and green and red indicating lamps. It will be recalled that when the green indicating lamp is lighted the associated valve is closed, while the red indicating lamp shows that the valve is open. These points are provided with control keys 1CK2 and 1CK3, and they are shown in the positions corresponding to the closed positions of the valves associated therewith.

At the remote location, points 2 and 3 are provided with interposing relays for effecting the desired operation of the valves associated therewith. Each point has two interposing relays associated therewith, one for closing the valve and the other for opening it. For point 2 they are designated respectively as 13IRC2 and 13IRO2.

Each of points 2 and 3 at the remote location is provided with auxiliary switch contacts which are controlled in accordance with the position of the valve associated therewith. Thus for point 2 auxiliary switch contacts 13ASC2 are closed when the valve associated with this point is closed, or starts to move to the closed position. Likewise, auxiliary switch contacts 13ASO2 are closed when the valve associated therewith is open and are closed when it starts to move from the closed to the open position.

At the control location, points 4 and 5 are illustrated in connection only with the supervision of the corresponding apparatus unit at the remote location. It will be noted that point 4 indicates supervision only of a valve and that point 5 indicates supervision only of a contactor which may be employed to control a blower or pump, interest being had only in whether the contactor is closed or open and the blower or pump running or stopped.

Point No. 1 at the control location is employed for initiating the simultaneous operation of the apparatus units at the remote location which have been preset to operate. For this purpose a control key 1CK1 is provided. For stopping any apparatus unit, once it has started to move and before it completes its movement, a stop key 1SK1 is provided.

At the remote location, a stop relay 13S1 is arranged to be operated in response to the transmission of a stop code for opening the control circuit for the valve operating mechanism. A single stop relay common to all of the valves may be used or a relay individual to each valve can be provided. Obviously, other circuits may be employed for deenergizing the valve operating mechanisms or to arrest their movement, as may be desired.

At the control location the time switch referred to hereinbefore is indicated at 2TS.

Likewise, the alarm key and reset key are indicated at 2AK and 2RK respectively.

The alarm lamp, the normal lamp and the line alarm lamp are indicated respectively at 2AL, 2NL and 2LAL. The alarm bell is indicated at 2AB.

Relay functions

There will now be set forth an outline of the relays which are employed in practicing the present invention, together with their functions.

| Control Location Figs. 1–9 | Remote Location Figs. 10–14 | Function |
|---|---|---|
| 91 | 101 | *Line Relay.*—Connected to the line wires L1 and L2, and normally energized; releases when the line is deenergized by impulsing. |
| 92 | 102 | *Receiving Relay.*—Operates at the start of an incoming code. Since it is a slow-release relay it will not drop out between impulses but will release only after the code of impulses is completed. |
| 93, 94 | 103, 104 | *Receiving Drive Relays.*—Energize after the first impulse is completed in an incoming code. After selection has been made and locked up they release to terminate the receiving conditions and release the counting chain. |
| 95 | 105 | *Impulse Sending Relay.*—Operates to send impulses by deenergizing the line. |
| 96 | 106 | *Sending Control Relay.*—Controls the operation of the Impulse Sending Relay 95 or 105. |
| 97, 98 | 107, 108 | *Sending Drive Relays.*—Energize at the start of an outgoing code. After the code is completed they release to terminate the sending condition and release the counting chain. |
| 99 | 109 | *Lockout Relay.*—Will cause the equipment to reset if it should attempt to send or receive more than 10 impulses in any one code, or if a group selection code of more than 2 impulses is received. This relay will also detect the fact that both stations are sending simultaneously and will reset the equipment. |
| 710 | | *Alarm Relay.*—Operates the alarm bell 2AB and the alarm lamp 2AL. |
| | 1010, 1052 | *Time Delay Relays.*—Operate in cascade during a reset operation to delay the sending relays at the Remote Location and allow the Control Location to cut in and perform an operation. These relays are of the extra-slow release type. |
| 811, 812, 813, 237, 238 | | *Time Delay Relays.*—Operate in cascade to time the automatic reset. These relays also time the release of the line relay 91 to give the line supervision alarm. |
| 914 | 1014 | *Group Stop Relay.*—Stops the impulsing when the correct number of impulses has been sent in the group selection code. |
| 915 | 1015 | *Group Code Relay.*—Locks up the selected group. |
| 916 | 1016 | *Group Check Relay.*—Stops the impulsing when the correct number of impulses has been sent in the group check code. |
| 917 | 1017 | *Point Stop Relay.*—Stops the impulsing when the correct number of impulses has been sent in the point selection code. |
| 918 | 1018 | *Point Code Relay.*—Locks up the selected point. |
| 919 | 1019 | *Point Check Relay.*—Stops the impulsing when the correct number of impulses has been sent in the point check code. |
| 920 | | *Battery Supervision Relay.*—Normally held energized and releases only when the control power is shut off, operates the reset relay 950 when power is turned on again. |
| 921, 922 | 1021, 1022 | *Start Relays.*—Operate to start an outgoing operation. |
| 923 | 1023 | *Start Relay.*—Operates to start an incoming operation. |
| 924 | 1024 | *Check Back Relay.*—Operates to reset the equipment when, in response to a previously transmitted selection code, a different check code is received. |
| 826 | 1226 | *Group Selection Control Relay.*—Operates on termination of an incoming group selection code to connect the counting chain contacts to the coils of the group selection relays. |
| 828 | 1228 | *Point Selection Contol Relay.*—Operates on termination of an incoming point selection code to connect the counting chain contacts to the coils of the point selection relays. |
| 730 | | *Supervision Control Relay.*—Operates on termination of an incoming supervision code to connect the counting chain contacts to the coils of the indication control relays. |
| | 1030 | *Operation Control Relay.*—Operates on termination of an incoming operation code to connect the counting chain contacts to the coils of the operation relays. |
| 731 to 743 | 1131 to 1143 | *Impulse Counting Chain Relays.*—Relays 731 to 740 and 1131 to 1140 operate on successive releases of the line relays 91 and 101 to count the impulses. Relays 741, 742, and 743, and 1141, 1142, and 1143 operate in succession as the line relays 91 and 101 are energized after each impulse to cause the counting relays to operate in sequence. |
| 745, 746, 947 | | *Operation Code Control Relays.*—Relay 745 causes three impulses to be sent for a stop code or a preset to open code. Relay 746 causes five impulses to be sent for a valve control code or a preset to close code. Relay 947 stops the impulsing when the correct number of impulses has been sent. |
| | 1046, 1047 | *Supervision Code Control Relays.*—Relay 1046 starts the transmission of the supervision code. Relay 1047 stops the impulsing when the correct number of impulses has been sent. |
| 548 | | *Release Relay.*—Operates to initiate reset of the equipment after the supervision code has been recorded. |
| | 1148, 1149, 1150 | *Supervision Code Control Relays.*—These relays control the number of impulses to be sent in the supervision code. Relay 1150 operates in response to the position of the preset relay. Relays 1148 and 1149 operate in response to the position of the valve auxiliary switch contacts. |
| 950 | | *Reset Control Relay.*—Initiates and terminates the long reset impulse. |
| 951 | 1051 | *Reset Relay.*—Operates under control of line relay 1 to energize the auxiliary positive battery bus. |
| 552, 553, 554, 555, 556, 557 | | *Indication Control Relays.*—These relays operate at the termination of the supervision code to set up the proper lamp indication. Relay 552 operates on a code of two impulses to give a red and green lamp indication. Relay 553 operates on a code of three impulses to give a green lamp indication when the blower or pump contactor is open or a red lamp indication when the valve is open. Relay 554 operates on a code of four impulses to give a red and white lamp indication. Relay 555 operates on a code of 5 impulses to give a red lamp indication when the blower or pump contactor is closed or a green lamp indication when the valve is closed. Relay 556 operates on a code of 6 impulses to give a green and white lamp indication. Relay 557 connects the contacts of indication control relays 552 to 556 to the coils of the lamp relays. |
| 758, 759, 760 | | *Lamp Flashing Relays.*—These relays impulse to flash any lamp connected to the lamp flashing bus. |
| 231, 232, 233 | | *Group Code Relays.*—These relays operate when energized by the point code relays 1FC1, 1F2, etc., and record the group or tens digit of the selection code. |
| | 1431, 1432, 1433 | *Group Code Relays.*—These relays operate when energized by the point code relays 13K2, etc., and prepare the group or tens digit of the selection code. |
| 239, 240 | | *Line Supervision Alarm Relays.*—Relay 239 operates in conjunction with timing relays 811, 812, 813, 237, and 238 to sound the alarm in case of line wire failure. Relay 240 silences the alarm when the alarm key is operated. |
| 3A1 to 3A5 | 13G1–13G5 | *Point Selection Relays.*—Operate in response to the selection code and prepare the individual point circuits. |
| 3B2 to 3B5 | | *Lamp Flashing Control Relays.*—Operate to connect the indicating lamps to the flashing bus and to start the flashing relays 758, 759 and 760. |
| 3C2 to 3C5, 3D2 to 3D5, 3E2–3E3. | | *Lamp Relays.*—Relays 3C2 to 3C4 and 3D5 operate the red lamps; relays 3D2 to 3D4 and 3C5 operate the green lamps, and relays 3E2–3E3 operate the white lamps. |

| Control Location Figs. 1-9 | Remote Location Figs. 10-14 | Function |
|---|---|---|
| 1F2 to 1F5 | | *Point Code and Start Relays.*—These relays are normally energized and are released when the control key is operated to record the point or units digit and also to start the equipment. |
| | 13H2 to 13H5 | *Point Supervision Relays.*—These relays are under control of the auxiliary switches of the device being supervised and change position for each operation of the device to prepare the equipment to transmit an indication of the operation. |
| | 13J2–13J3 | *Preset Relays.*—When these relays are energized the valves individual thereto are preset to close. When these relays are deenergized the valves are preset to open. |
| | 13K2 to 13K5 | *Point Code and Start Relays.*—These relays are normally energized and release whenever the associated valve or preset relay changes position to record the point or units digit of the selection code and to start the equipment to transmit the indication. |
| 3B1 | | *Alarm Restoring Relay.*—Operates when energized by the time switch 2TS to restore the alarm circuit after the alarm had been cut off during a valve control operation. |
| 3C1 | | *Auxiliary Stopping Relay.*—Operates on a valve stopping operation to reset the time switch 2TS and restore the alarm circuit. |
| 3D1 | | *Alarm Cutout Relay.*—Operates when a valve control operation is performed and disconnects the alarm circuit until released by the time switch 2TS. |
| 1FC1, 1FS1 | | *Point Code and Start Relays.*—Operate when energized by the control keys to record the point or units digit of the selection code and to start the equipment. Relay 1FC1 operates on a control operation and relay 1FS1 on a stopping operation. |
| | 13J1, 13H1 | *Operation Relays.*—Relay 13J1 energizes the valve stopping interposing relay 13S1 and relay 13H1 energizes the valve open or close interposing relays 13IRO2 and 13IRC2, etc. |
| 6T1, 4T2 | 12T1, 14T2 | *Group Selection Relays.*—These relays operate in response to the group code and prepare the point selection relay energizing circuits of all points within the selected group. |

*Explanation of codes*

All operations are performed by the control location equipment and the remote location equipment alternately transmitting codes of impulses. When an operation is performed by the operator at the control location, codes are transmitted as follows:

| | Control Location Transmits | Remote Location Transmits |
|---|---|---|
| 1 | Group Selection Code | |
| 2 | | Group Check Code. |
| 3 | Point Selection Code | |
| 4 | | Point Check Code. |
| 5 | Operation Code | |
| 6 | | Supervision Code. |
| 7 | Reset Code | |

When the remote location reports an operation to the control location, codes are transmitted as follows:

| | Control Location Transmits | Remote Location Transmits |
|---|---|---|
| 1 | | Group Selection Code. |
| 2 | Group Check Code | |
| 3 | | Point Selection Code. |
| 4 | Point Check Code | |
| 5 | | Supervision Code. |
| 6 | Reset Code | |

The group and point codes are determined by the point assignment number of the device being controlled. The group code corresponds to the "tens" digit and the point code corresponds to the "units" digit of the point assignment number. Point assignment numbers from 1 to 10 inclusive are in group 1 and have a group code of one impulse. Point assignment numbers from 11 to 20 inclusive are in group 2 and have a group code of two impulses, etc. The first point in each group has a point code of one impulse, the second point in each group has a point code of two impulses, etc.

For example, point 1 (group 1, point 1) has a group code of one impulse and a point code of one impulse. Point 3 (group 1, point 3) has a group code of one impulse and a point code of 3 impulses. Point 11 (group 2, point 1) has a group code of two impulses and a point code of one impulse.

In all cases, the check code has the same number of impulses as the associated selection code.

The reset code always consists of one long impulse and is always transmitted by the control location equipment.

The operation code is always transmitted by the control equipment. The number of impulses in the operation code depends on the operation being performed and is the same for all apparatus units, such as valves, being controlled. The following operation codes are used:

| Operation to be Performed | Number of Impulses |
|---|---|
| Operate preset relay to "preset-to-close" position | 5 |
| Operate preset relay to "preset-to-open" position | 3 |
| Operate valves (Point 1 only) | 5 |
| Stop valves (Point 1 only) | 3 |
| Check the position of a device which is supervised only | 1 |

The supervision code is always transmitted by the equipment at the remote location. The number of impulses in the supervision code depends on the indication which is being reported to the control location and is the same for all devices whose position is supervised. The following supervision codes are used:

| Indication Being Reported | Number of Impulses |
|---|---|
| Valve in mid-position | 2 |
| Valve open | 3 |
| Blower on pump stopped | 3 |
| Valve open and preset to close | 4 |
| Valve closed | 5 |
| Blower or pump running | 5 |
| Valve closed and preset to open | 6 |

*Presetting and operating valves on points 2 and 3*

In order to describe the control functions of the present invention, it will be assumed that the valve which is associated with point 2 is open and that the valve associated with point 3 is closed. Further, it will be assumed that the operator desires to preset these valves so that they can be operated subsequently to the opposite positions. It will be assumed also that the operator wishes to effect simultaneous operation of the valves, i. e., to close the valve associated with point 2 and open the valve associated with point 3. It will be understood that the sequences of operations which are to be described presently are illustrative of the sequences of operations involved when a larger number of valves, say 20, 30 or 40, are to be preset and then operated simultaneously from one position to the other. However, in order to condense the description of the system, it will be confined to a detailed outline of the manner in which only the valves associated with points 2 and 3 are operated simultaneously.

The operations at the control location will be described as they take place, followed in each case by the corresponding operations taking place at the remote location and vice versa, in setting forth how the valve on point 2 is preset to close.

*Explanation of circuit tracing*

In view of the fact that the circuit connections as illustrated in the drawings are complicated, and involve a large number of conductors, no attempt has been made to apply reference characters to any of the conductors, aside from the conductors forming the channel between the locations and indicated by the reference characters L1 and L2. The circuits will be traced entirely through the use of battery symbols, the contact members of the relays, control keys, relay windings, and resistors.

No attempt will be made to describe each circuit as traced by words, but rather only the contact members, relay windings, resistors, etc., will be employed through the use of symbols.

The individual resistors are indicated by their ohmic values, and these values or numbers will be employed in tracing the circuits therethrough.

At the control location, positive battery is indicated by a double circle surrounding a plus sign. This positive battery is connected through contacts 95lb to a positive bus, which is indicated by a single circle surrounding a plus sign. At the remote location, the double circle surrounding a plus sign indicates the positive of the 48 volt battery at this end of the system. The single circle surrounding the plus sign indicates a positive bus which is connected to the positive of the 48 volt battery through contacts b109a. In tracing the circuits at the control and remote locations, no attempt will be made to distinguish between positive battery and the positive bus which is connected to the positive battery through contacts 95lb and c109a.

For illustrative purposes, the manner in which the energizing circuit for the winding of start relay 921 will now be traced, and explained, as follows:

921 pulls: —, 921, 231b, b923f, +

This circuit, in words, is as follows: Start relay 921 is energized over a circuit which may be traced from negative battery through the operating winding of start relay 921, the second set of front contacts from the left of group code relay 231, the back contacts of the sixth set of contacts from the left of start relay 923, to positive battery over the second set of contacts from the left of normally energized reset relay 951, which connects to positive battery.

It will be noted that the various indicating lamps are energized from alternating rather than direct current. The purpose of this is to reduce the drain on the battery and to prolong the life of the lamps. At the remote location the interposing relays are energized from alternating current. The alternating current source terminals are indicated by a single circle surrounding a negative sign, and a double circle surrounding a positive sign, each also having associated therewith a portion of a sine wave to indicate that an alternating current source is intended. Since these circuits are few in number, they will be traced, generally, by words rather than by symbols.

*Presetting valve on point 2 to close*

At the control location, line relay 91, reset relay 951 and battery supervision relay 920 are energized. Point code and start relays 1F2 and 1F3 are energized, as shown in the drawings. Lamp relay 3C2 is energized, and the red lamp associated with point 2 is lighted, indicating that the valve associated with point 2 at the remote location is open. Lamp relay 3D3 is energized and the green lamp of point 3 is lighted, indicating that the valve associated with point 3 at the remote location is closed.

At the remote location, line relay 101 and reset relay 1051 are energized. It will be noted that the line relay 91 at the control location and the line relay 101 at the remote location are energized in series through break contacts of impulse sending relays 95 and 105 at the control and remote locations respectively, and that the line relays are energized from the 48 volt battery at the remote location. Point code and start relays 13K2 and 13K3 at the remote location are energized. Point supervision relays 13H2 and 13H3 also are energized. Preset relay 13J2 is deenergized while preset relay 13J3 is energized. Auxiliary switch contacts 13ASC2 are open while contacts 13ASO2 are closed. Auxiliary switch contacts 13ASC3 are closed, while contacts 13ASO3 are open.

The operator now moves the control key 1CK2 to the position shown in the drawings, in order to preset the valve associated with point 2 at the remote location to operate from the open to the closed position. At contacts 1CK2a the energizing circuit for the upper winding of relay 1F2 is opened, and this relay is deenergized. At contacts b1F2a, an obvious energizing circuit is completed for energizing group code relay 231.

Start relays 921 and 922 are energized as follows:

921 pulls: —, 921, 231b, b923f, +

Relay 922 pulls in parallel with relay 921.

Sending control relay 96 is now energized.

96 pulls: —, 96, b924a, 94a, 922f, 914c, +

Normal lamp 2NL is lighted over 922b.

Impulse sending relay 95 is now energized to open the line circuit and thereby transmit the group selection code which in the case assumed is one impulse, i. e., one deenergization of the line circuit.

95 pulls: —, 95, b950c, f91a, 96a, b924a, 94a, 922f, 914c, +

The energization of sending control relay 96 completes an obvious circuit for energizing sending drive relays 97 and 98.

The energization of impulse sending relay 95 opens the line circuit at the control location and line relay 91 is deenergized.

At contacts 98a an energizing circuit for time delay relay 811 is completed. As a result, time delay relays 812, 813, 237 and 238 are sequentially energized. The deenergization of line relay 91 opens the previously traced energizing circuit for impulse sending relay 95, and it is deenergized, but does not drop immediately. Another result of the deenergization of line relay 91 is to energize counting chain relay 731.

731 pulls: —, 731, b741b, b742b, b743b, 730a, 99b, f951a, b91b, +

Since point 2 is in group 1, group stop relay 914 now is energized.

914 pulls: —, 914, 914b, 922c, f231a, 731a, b732a, b733a, b734a, b735a, b736a, b737a, b738a, b739a, b740a, b94b, f921d, +
Relay 914 holds at f914b.

Impulse sending relay 95 drops a short time after its deenergization, due to its time delay characteristic. Line relay 91 is thereupon again energized.

At the remote location line relay 101 is deenergized as a result of the energization of impulse sending relay 95 at the control location. As a result of the dropping of line relay 101, receiving relay 102 is energized.

102 pulls: —, 102, b198a, 106c, 1051b, b101a, +
Also as a result of the deenergization of line relay 101 counting chain relay 1131 is energized.

1131 pulls: —, 1131, b1141c, b1142c, b1143c, 109b, 1051b, b101a, +

Start relay 1023 is now energized as a result of the energization of counting chain relay 1131.

1023 pulls: —, 1023, 1131a, b1021b, +

The energization of start relay 1023 causes energization of time delay relay 1010.

1010 pulls: —, 1010, 1023a, b1030a, +

An obvious energizing circuit for time delay relay 1052 is completed at 1010a.

Line relay 101 is now energized as a result of the dropping of impulse sending relay 95 at the control location. Line relay 91 at the control location also is energized, as stated. The sending and receipt of the group selection code has now been completed.

At the control location the previously traced energizing circuit for sending control relay 96 is opened at 914c, and it is deenergized.

As a result of the pulling of line relay 91, counting chain relay 741 is energized in series with counting chain relay 731.

741 pulls: —, 731, 731b, 741, 742a, 97c, +

The deenergization of sending control relay 96 opens the energizing circuit to sending drive relays 97 and 98. Relay 97 promptly drops while relay 98 drops after a time interval. The previously traced energizing circuit for counting chain relays 731 and 741 is opened at 97c, and they are deenergized. Sending drive relay 98 finally drops and opens the energizing circuit for time delay relay 811. Relay 811 drops after a relatively long time, and opens the energizing circuit for time delay relay 812. However, sending drive relay 98 or receiving relay 92, which at 92a also completes an energizing circuit for relay 811, do not remain deenergized for a sufficient length of time to permit time delay relays 813, 237 and 238 to be deenergized while codes are being transmitted between the control and remote locations; rather, as will appear hereinafter, relay 811 is again energized. Since relay 811 is not deenergized long enough while codes are being transmitted to effect the deenergization of the time delay relay chain associated therewith, its deenergization and energization will not be referred to until it permits the chain to be fully deenergized and all of the relays therein drop to restart the system on the occurrence of a long impulse during the transmission of code between the control and remote locations.

The selection of group 1 at the remote location is completed after line relay 101 is energized as a result of the dropping of impulse sending relay 95 as stated. At contacts b101a the previously traced energizing circuit for receiving relay 102 is opened and it is deenergized. Because of its time delay characteristic it does not drop until after a predetermined interval.

A further result of the energization of line relay 101 is to cause counting chain relay 1141 to pull in series with counting chain relay 1131.

1141 pulls: —, 1131, 1131c, 1141, 1142b, 109c, 108b, 1015b, +

As a result of the energization of counting chain relay 1141 receiving drive relay 103 is energized.

103 pulls: —, 103, 1141a, 102a, +

An obvious energizing circuit is completed at 103b for relay 104. Receiving relay 102 now drops. Group selection control relay 1226 is now energized.

1226 pulls: —, 1226, b1016a, b1017a, b102b, 103c, b1046c, b102a, +

Group selection relay 12T1 for group 1 is now energized.

12T1 pulls: —, 12T1, 1226a, 1131d, b1132c, b1133e, b1134c, b1135e, b1136c, b1137c, b1138c, b1139c, b1140c, f104b, +

Group code relay 1015 is now energized at 12T1l in parallel with group selection relay 12T1 and holds in over contacts f1015b, as does group selection relay 12T1. As a result of the energization of group code relay 1015, the previously traced energizing circuit for counting chain relays 1131 and 1141 is opened at b1015b and they drop.

As a result of the deenergization of counting chain relay 1141 receiving drive relay 103 is deenergized, and it in turn deenergizes relay 104. They both drop.

At the remote location sending control relay 106 is now energized to initiate the transmission of the group check code.

106 pulls: —, 106, 104a, 1015a, b1016b, b1017b, +

Impulse sending relay 105 energizes in parallel with sending control relay 106 on closure of 106b. Another result of the energization of sending control relay 106 is to complete obvious energizing circuits for sending driving relays 107 and 108.

The energization of impulse sending relay 105 opens the line circuit and as a result line relay 101 at the remote location and line relay 91 at the control location drop. This initiates the transmission to the control location of the single impulse of the group check code for group 1.

At the control location, as a result of the dropping of line relay 91, receiving relay 92 is energized.

92 pulls: —, 92, b98c, 96b, 730a, 99b, f951a, b91b, +

Counting chain relay 731 is also energized over the circuit previously traced.

Check back relay 924 is now energized in response to the receipt of the proper check-back code.

924 pulls: —, 500, 924, 92c, 922d, b947b, +

Relay 924 holds over the resistor in series with 924b.

At the remote location impulse sending relay 105 is deenergized as a result of the deenergization of line relay 101. However, it does not drop until after the expiration of a predetermined interval. In the meantime, counting chain relay 1131 is again energized over the circuit previously traced. Group check relay 1016 is now energized.

1016 pulls: —, 1016, b1018b, b1021a, b104b, b1140c, b1139c, b1138c, b1137c, b1136c, b1135e, b1134c, b1133e, b1132c, 1131d, 1226a, 12T1l, f1915b, +

As a result of the energization of group check relay 1016 the holding circuit for group selection control relay 1226 is opened at b1016c and relay 1226 drops.

Impulse sending relay 105 now drops and again completes the line circuit for energizing line relay 101 at the remote location, and line relay 91 at the control location.

At the control location receiving relay 92 is deenergized, but does not drop immediately, and counting chain relay 741 is energized in series with counting chain relay 731.

741 pulls: —, 731, 731b, 741, 742a, 98b, b915a, +

Receiving drive relay 93 is now energized as a result of the energization of counting chain relay 741.

93 pulls: —, 93, 741c, f92d, +

An obvious energizing circuit for receiving drive relay 94 is completed at 93a.

Receiving relay 92 now drops and group selection control relay 826 is energized.

826 pulls: —, 826, b916c, b917c, 93c, b92d, +

Group selection relay 6T1 is now energized.

6T1 pulls: —, 6T1, 826a, 731a, b732a, b733a, b734a, b735a, b736a, b737a, b738a, b739a, b740a, f94b, +

At contacts 826f, a circuit is completed for shunting down check-back relay 924, and it drops. This circuit may be traced as follows:

924 drops: —, 500, 826f, 922c, f231a, 731a, b732a, b733a, b734a, b735a, b736a, b737a, b738a, b739a, b740a, f94b, +

At contacts 6T1a, a circuit is completed for energizing group code relay 915 in parallel with group selection relay 6T1. Group code relay 915 and group selection relay 6T1 hold in over f915a.

As a result of the energization of group code relay 915 the energizing circuit for counting chain relays 731 and 741 is opened and they drop. The dropping of counting chain relay 741 opens the energizing circuit for receiving drive relay 93, and it drops and opens the energizing circuit for relay 94 and group selection control relay 826, and they also drop.

The dropping of receiving drive relay 94 completes an energizing circuit for sending control relay 96 for the purpose of initiating the transmission of the point selection code to the remote location.

96 pulls: —, 96, b924a, 94a, 915c, b916b, b917b, +

At the remote location as a result of the energization of line relay 101, the energizing circuit for sending control relay 106 is opened and it drops. Counting chain relay 1141 energizes in series with counting chain relay 1131.

1141 pulls: —, 1131, 1131c, 1141, 1142b, 109c, 107a, +

As a result of the deenergization of sending control relay 106, the energizing circuits for sending drive relays 107 and 108 are opened. Relay 107 drops promptly, while relay 108 drops after a predetermined interval. Counting chain relay 1131 and 1141 are deenergized as a result of the dropping of relay 107. Sending drive relay 108 now drops.

At the control location, as a result of energization of sending control relay 96, impulse sending relay 95 is again energized to open the line circuit and transmit the first impulse of the two impulse point selection code, since point 2 is the point being selected.

95 pulls: —, 95, b950c, f91a, 96a, b924a, 94a, 915c, b916b, b917b, +

A further result of the energization of sending control relay 96 is to complete obvious circuits for energizing drive relays 97 and 98.

The energization of impulse sending relay 95 opens the line circuit and line relay 91 is deenergized. The dropping of line relay 91 opens the energizing circuit for impulse sending relay 95. A further result of the dropping of line relay 91 is to complete the previously traced energizing circuit for counting chain relay 731.

At the remote location, as a result of the energization of the impulse sending relay 95 at the control location, line relay 101 drops on receipt of the first impulse of the point selection code. Receiving relay 102 is energized over the previously traced circuit. The previously traced energizing circuit for counting chain relay 1131 is now completed and it is energized. The first impulse of the point selection code now has been recorded on the counting chain at the remote location.

At the control location, impulse sending relay 95 drops and line relay 91 is energized. This results in the energization of impulse sending relay 95 to terminate the transmission of the first impulse of the point selection code and the energization of counting chain relay 741 in series with relay 731.

741 pulls: —, 731, 731b, 741, 742a, 97c, +

At the remote location, line relay 101 is again energized as a result of the dropping of impulse sending relay 95 at the control location. Counting chain relay 1141 then energizes in series with relay 1131.

1141 pulls: —, 1131, 1131c, 1141, 1142b, 109c, 108b, b1018c, f1016b, b1017b, +

At the control location, as a result of the energization of impulse sending relay 95, the line circuit is opened to transmit the second impulse of the point selection, and line relay 91 drops. The energizing circuit for impulse sending relay 95 is opened. A circuit is completed for energizing counting chain relay 732 to record the second impulse of the code.

732 pulls: —, 732, 731c, f741b, b742b, b743b, 730a, 99b, f951a, b91b, +

Since the code of two impulses for point 2 has been transmitted, point stop relay 917 is energized to prevent further code transmission.

917 pulls: —, 917, b917a, f97a, 922e, 6T1g, b1FC1a, b1F2b, f732a, b733a, b734a, b735a, b736a, b737a, b738a, b739a, b740a, b94b, f921d, +

Relay 917 holds at f917a.

Line relay 101 at the remote location drops on receipt of the second impulse of the point selection code. Receiving drive relay 103 is energized.

103 pulls: —, 103, 1141a, f102a, +

At 103b, an obvious energizing circuit for relay 104 is completed.

A further result of the deenergization of line relay 101 is to complete an energizing circuit for counting chain relay 1132.

1132 pulls: —, 1132, 1131b, f1141c, b1142c, b1143c, 109b, 105lb, b101a, +

The second impulse of the point selection code is now recorded on the counting chain at the remote location.

At the control station, as a result of the dropping of impulse sending relay 95, line relay 91 is again energized. The transmission of the point selection code has now been completed.

Sending control relay 96 drops as a result of the energization of line relay 91, and counting chain relay 742 pulls in series with relay 732.

742 pulls: —, 732, 732b, 742, 743a, 97c, +

Sending driving relays 98 and 97 and counting chain relays 731 and 741 are denergized. All except relay 98 drop promptly. It drops after the expiration of a predetermined interval. Counting chains relays 732 and 742 drop as a result of the dropping of relay 97.

At the remote location, as result of the dropping of impulse sending relay 95 at the control location, the line circuit is closed and line relay 101 is again energized. Receiving relay 102 is deenergized and counting chain relay 1142 is energized in series with relay 1132.

1142 pulls: —, 1132, 1132b, 1142, 1143b, 109c, 108b, b1018c, f1016b, b1017b, +

Counting chain relays 1131 and 1141 are deenergized and they drop.

Receiving relay 102 drops and completes a circuit for energization of point selection control relay 1228.

1228 pulls: —, 1228, b1019c, f1016a, b1017a, b102b, 103c, b1046c, b102a, +

A circuit is now completed for energizing point selection relay 13G2.

13G2 pulls: —, 13G2, 12T1b, 1228b, f1132c, b1133e, b1134c, b1135e, b1136c, b1137c, b1138c, b1139c, b1140c, f104b, +

As soon as point 2, the point which was selected to be controlled, has been selected and relay 13G2 has been operated, a point check code is transmitted from the remote location to the control location. For this purpose, point code relay 1018 is energized, at contacts 13G2f in parallel with relay 13G2, and holds over f1018c. Supervision code control relay 1149 is now energized.

1149 pulls: —, 1149, 13G2d, 13ASO2, +

The energizing circuit for counting chain relays 1132 and 1142 is opened at 1018c and they drop. Receiving drive relay 103 drops and in turn relay 104 drops.

In order to transmit the point check code, sending control relay 106 is energized.

106 pulls: —, 106, 104a, 1018a, b1019a, b1047b, +

Impulse sending relay 105 is energized.

105 pulls: —, 105, f101b, 106b, 104a, 1018a, b1019a, b1047b, +

The energization of sending control relay 106 completes obvious energizing circuits for sending drive relays 107 and 108.

The energization of impulse sending relay 105 opens the line circuit to send the first impulse of the two impulse point check code, and line relay 101 drops.

The dropping of line relay 101 deenergizes impulse sending relay 105. Counting chain relay 1131 is energized, over the previously traced circuit.

At the control location, as a result of the energization of impulse sending relay 105, line relay 91 drops. Receiving relay 92 is energized over the previously traced circuit.

Counting chain relay 731 pulls as a result of the dropping of line relay 91 over the previously traced energizing circuit.

Check-back relay 924 is energized over the previously traced circuit.

At the remote location, impulse sending relay 105 drops and closes the line circuit, thereby completing the transmission of the first impulse of the point check code and energized line relay 101. Impulse sending relay 105 is energized as a result of the energization of line relay 101 over the last traced energizing circuit therefor.

Counting chain relay 1141 pulls in series with relay 1131.

1141 pulls: —, 1131, 1131c, 1141, 1142b, 109c, 107a, +

At the control location, as a result of the dropping of impulse sending relay 105, line relay 91 is energized. Counting chain relay 741 pulls in series with relay 731.

741 pulls: —, 731, 731b, 741, 742a, 98b, b918a, f917b, +

At the remote location, as a result of the energization of impulse sending relay 105, line relay 101 is deenergized at the beginning of the transmission of the second point check code impulse. Impulse sending relay 105 is deenergized and counting chain relay 1132 is energized over the previously traced energizing circuit.

Point check relay 1019 is now energized as a result of the transmission of the second point check code impulse.

1019 pulls: —, 1019, f1018b, b1021a, b104b, b1140c, b1139c, b1138c, b1137c, b1136c, b1135e, b1134c, b1133e, f1132c, 1228b, 12T1b, 13G2f, f1018c, f1016b, b1017b, +

Point selection control relay 1228 drops.

After the expiration of a predetermined interval, impulse sending relay 105 drops and line relay 101 pulls. The transmission of the point check code is now complete.

Sending control relay 106 is deenergized, and counting chain relay 1142 is energized in series with relay 1132.

1142 pulls: —, 1132, 1132b, 1142, 1143b, 109c, 107a, +

Sending drive relays 108 and 107 and counting chain relays 1131 and 1141 are deenergized. Counting chain relays 1132 and 1142 also are deenergized. All of these relays, except relay 108, drop promptly. It drops after the expiration of a predetermined interval.

At the control location, as a result of the energization of the impulse sending relay 105, line relay 91 drops. Receiving drive relay 93 is energized.

93 pulls: —, 93, 741c, f92d, +

Counting chain relay 732 is energized as a result of the dropping of line relay 91 over the previously traced circuit.

The energization of relay 93 completes an obvious energizing circuit for relay 94.

When impulse sending relay 105 drops, line relay 91 is again energized, thus completing the receipt of the second impulse of the point check code.

Receiving relay 92 is deenergized and counting chain relay 742 pulls in series with relay 732.

742 pulls: —, 732, 732b, 742, 743a, 98b, b918a, f917b, +

Counting chain relays 731 and 741 are deenergized, and drop. Receiving relay 92 drops after the predetermined interval and point selection control relay 828 is energized.

828 pulls: —, 828, b919a, b947a, f917c, 93c, b92d, +

Point selection relay 3A2 is now energized.

3A2 pulls: —, 3A2, 6T1k, 828b, f732a, b733a, b734a, b735a, b736a, b737a, b738a, b739a, b740a, f94b, +

A further result of the energization of point selection control relay 828 is to complete a circuit at 828f for shunting down check-back relay 924.

The next step is to initiate the necessary relay operations to send the preset to close code of five impulses. Point code relay 918 is energized at 3A2f in parallel with point selection relay 3A2. Operation code control relay 746 is now energized.

746 pulls: —, 746, 1CK2c, 3A2h, +

Counting chain relays 732 and 742 and receiving drive relays 93 and 94 are deenergized and drop. Point selection control relay 828 also drops.

Sending control relay 96 is energized.

96 pulls: —, 96, b924a, 94a, 918c, b947c, b919c, +

Impulse sending relay 95 is energized.

95 pulls: —, 95, b950c, f91a, 96a, b924a, 94a, 918c, b947c, b919c, +

A further result of the energization of sending control relay 96 is to complete obvious energizing circuits for sending drive relays 97 and 98.

The energization of impulse sending relay 95 opens the line circuit to transmit the first impulse of the five impulse preset to close code, and line relay 91 drops. The impulse sending relay 95 is deenergized, but does not drop immediately. A further result of the dropping of line relay 91 is to complete the previously traced circuit for energizing counting chain relay 731.

At the remote location, as a result of the energization of the impulse sending relay 95 at the control location, line relay 101 drops. Receiving relay 102 is energized over the previously traced circuit. A further result of the dropping of line relay 101 is to complete the previously traced energizing circuit for counting chain relay 1131.

At the control location, impulse sending relay 95 drops and the line circuit is closed, thereby terminating the transmission of the first impulse of the preset to close code. Line relay 91 is energized, and as a result, impulse sending relay 95 is energized. A further result of the energization of line relay 91 is to complete an energizing circuit for counting chain relay 741 in series with relay 731.

741 pulls: —, 731, 731b, 741, 742a, 97c, +

At the remote location, as a result of the dropping of impulse sending relay 95 to terminate the transmission of the first impulse of the preset to close code, line relay 101 is energized. Counting chain relay 1141 then pulls in series with relay 1131.

1141 pulls: —, 1131, 1131c, 1141, 1142b, 109c, 108b, b1046a, f1019a, b1047b, +

At the control location, as a result of the energization of impulse sending relay 95, the line is opened to transmit the second impulse of the preset to close code, and line relay 91 drops. The impulse sending relay 95 is deenergized, but does not drop immediately, and counting chain relay 732 is energized over the previously traced circuit.

At the remote location, the energization of impulse sending relay 95 causes the dropping of line relay 101 and the energization of receiving drive relay 103.

103 pulls: —, 103, 1141a, f102a, +

As a result of the dropping of line relay 101, counting chain relay 1132 is energized over the previously traced circuit. Receiving drive relay 104 is energized over an obvious circuit on energization of relay 103.

At the control location impulse sending relay 95 drops to terminate the transmission of the second impulse of the preset to close code, closes the line circuit, and energizes line relay 91. This effects the deenergization of impulse sending relay 95 and also the energization of counting chain relay 742 in series with relay 732.

742 pulls: —, 732, 732b, 742, 743a, 97c, +

At the remote location the dropping of impulse sending relay 95 effects the energization of line relay 101. As a result, counting chain relay 1142 is energized in series with relay 1132.

1142 pulls: —, 1132, 1132b, 1142, 1143b, 109c, 108b, b1046a, f1019a, b1047b, +

At the control location, as a result of the energization of impulse sending relay 95, line relay 91 drops and counting chain relays 731 and 741 drop. Impulse sending relay 95 is deenergized, but does not drop immediately, and counting chain relay 733 is energized.

733 pulls: —, 733, 732c, f742b, b743b, 736a, 99b, f951a, b91b, +

The last energization of impulse sending relay 95 initiated the transmission of the third impulse of the preset to close code and drops line relay 101 at the remote location. Counting chain relays 1131 and 1141 drop and counting chain relay 1133 is energized.

1133 pulls: —, 1133, 1132a, f1142c, b1143c, 109b, 1051b, b101a, +

At the control location, impulse sending relay 95 drops, closes the line circuit and energizes line relay 91. The impulse sending relay 95 is again energized, while counting chain relay 743 is energized in series with relay 733.

743 pulls: —, 733, 733b, 743, 741a, 97c, +

The last dropping of impulse sending relay 95 again closes the line circuit to terminate the transmission of the third impulse of the preset to close code, and line relay 101 at the remote location is again energized. Counting chain relay 1143 now pulls in series with relay 1133.

1143 pulls: —, 1133, 1133d, 1143, 1141b, 109c, 108b, b1046a, f1019a, b1047b, +

At the control location the pulling of impulse sending relay 95 drops line relay 91, and counting chain relays 732 and 742 drop. Impulse sending relay 95 is again deenergized, but does not drop immediately, and counting chain relay 734 is energized.

734 pulls: —, 734, 733c, f743b, 730a, 99b, f951a, b91b, +

At the remote location, as a result of the pulling of impulse sending relay 95, the transmission of the fourth impulse of the preset to close code is initiated, and line relay 101 and counting chain relays 1132 and 1142 drop. Counting chain relay 1134 is energized.

1134 pulls: —, 1134, 1133c, f1143c, 109b, 1051b, b101a, +

At the control location, impulse sending relay 95 drops and line relay 91 is again energized, thereby terminating the transmission of the fourth impulse. Impulse sending relay 95 is energized and counting chain relay 741 pulls in series with relay 734.

741 pulls: —, 734, 734b, 741, 742a, 97c, +

At the remote location at the termination of the transmission of the fourth impulse, line relay 101 is energized, and counting chain relay 1141 is energized in series with relay 1134.

1141 pulls: —, 1134, 1134b, 1141, 1142b, 109c, 108b, b1046a, f1019a, b1047b, +

At the control location, the energization of impulse sending relay 95 opens the line circuit to initiate the transmission of the fifth impulse of the preset to close code. Line relay 91 drops and counting chain relays 733 and 743 drop. Impulse sending relay 95 is deenergized, but does not drop immediately. Counting chain relay 735 is energized.

735 pulls: —, 735, 734c, f741b, b742b, b743b, 730a, 99b, f951a, b91b, +

Operation code control relay 947 is energized.

947 pulls: —, 947, 918d, 921c, 97b, b745b, f746c, f735a, b736a, b737a, b738a, b739a, b740a, b94b, f921d, +

Relay 947 holds over f947b.

At the remote location, on the initiation of the transmission of the fifth impulse of the preset to close code, line relay 101 drops and counting chain relays 1133 and 1143 also drop. Counting chain relay 1135 is energized.

1135 pulls: —, 1135, 1134a, f1141c, b1142c, b1143c, 109b, 1051b, b101a, +

At the control location, impulse sending relay 95 drops to close the line circuit and complete the transmission of the fifth and last impulse of the preset to close code. Line relay 91 is then energized, sending control relay 96 drops, and counting chain relay 742 is energized in series with relay 735.

742 pulls: —, 735, 735b, 742, 743a, 97c, +

Sending drive relays 98 and 97 and counting chain relays 734 and 741 are deenergized, the last three dropping immediately, while relay 98 drops after a predetermined interval. Counting chain relays 735 and 742 also drop and finally sending drive relay 98 drops.

At the remote location on the completion of the transmission of the fifth and last impulse of the preset to close code line relay 101 is energized. Receiving relay 102 is deenergized, and counting chain relay 1142 is energized in series with relay 1135.

1142 pulls: —, 1135, 1135d, 1142, 1143b, 109c, 108b, b1046a, f1019a, b1047b, +

Counting chain relays 1134 and 1141 drop and finally receiving relay 102 drops.

Operation control relay 1030 is now energized.

1030 pulls: —, 1030, f1019c, f1016a, b1017a, b102b, 103c, b1046c, b102a, +

Time delay relay 1010 is deenergized at b1030a, but does not drop out immediately.

Preset relay 13J2 is now energized to prepare the necessary circuit for operating the valve associated with point 2 to the close position.

13J2 pulls: +, 13J2, 13G2b, 1135b, 1030c, 60, —

Relay 13J2 holds over 13J2c.

Supervision code control relay 1150 is now energized to initiate the operation necessary to transmit the valve open and preset to close code.

1150 pulls: —, 1150, 13G2a, 13J2b, +

At contacts f13J2d and f13J2e, the energizing circuit for relay 13K2 is opened and its polarity is reversed; the relay then drops.

Group code relay 1431 is now energized.

1431 pulls: —, 1431, b13K2b, +

By this time time delay relay 1010 has dropped, and it opens the energizing circuit for time delay relay 1052, which finally drops and completes an energizing circuit for supervsion code control relay 1046.

1046 pulls: —, 1046, 1052, f1018c, f1016b, b1017b, +

The energizing circuits for operation control relay 1030 and counting chain relays 1135 and 1142 are opened and they drop. Receiving drive relay 103 drops and, as a result, relay 104 drops. Sending control relay 106 is now energized.

106 pulls: —, 106, 104a, 1018a, f1046a, f1019a, b1047b, +

Impulse sending relay 105 is energized in parallel with relay 106 and the line circuit is opened to initiate the transmission of the first impulse of the four impulse valve open and preset to close code. Sending drive relays 107 and 108 are energized over obvious circuits, as a result of the energization of sending control relay 106.

Line relay 101 drops as a result of the energization of impulse sending relay 105, and it in turn deenergizes the impulse sending relay 105, but it does not drop immediately. Counting chain relay 1131 is energized over the previously traced circuit.

At the control location, in response to the receipt of the first impulse of the valve open and preset to close code line relay 91 drops. Receiving relay 92 is energized over the circuit previously traced. Counting chain relay 731 also is energized over the circuit previously traced.

At the remote location impulse sending relay 105 finally drops and closes the line circuit. Line relay 101 is energized and it in turn energizes impulse sending relay 105. Counting chain relay 1141 is energized in series with relay 1131.

1141 pulls: —, 1131, 1131c, 1141, 1142b, 109c, 107a, +

At the control location in response to the termination of the first impulse by the dropping of impulse sending relay 105, line relay 91 is energized. Counting chain relay 741 is energized in series with relay 731.

741 pulls: —, 731, 731b, 741, 742a, 98b, f947c, b919c, +

At the remote location in response to the energization of impulse sending relay 105, the line circuit is opened and line relay 101 drops. As a result, impulse sending relay 105 is deenergized, but does not drop immediately. Counting chain relay 1132 is energized over a circuit which has been traced previously.

At the control location on receipt of the beginning of the second impulse, line relay 91 drops and receiving drive relay 93 is energized.

93 pulls: —, 93, 741c, f92d, +

Relay 94 is energized as a result of the energization of relay 93. Counting chain relay 732 is energized over a circuit which has been traced previously.

Impulse sending relay 105 finally drops. At the remote location, in response to the closing of the line circuit and termination of the second impulse, line relay 101 is energized. It energizes impulse sending relay 105. Counting chain relay 1142 is energized in series with relay 1132.

1142 pulls: —, 1132, 1132b, 1142, 1143b, 109c, 107a, +

At the control location, in response to the closing of the line circuit by the dropping of impulse sending relay 105, line relay 91 is energized. Counting chain relay 742 is energized in series with relay 732.

742 pulls: —, 732, 732b, 742, 743a, 98b, f947c, b919c, +

At the remote location, in response to the energization of impulse sending relay 105, the line is opened to transmit the third impulse of the preset to close code and line relay 101 drops. Counting chain relays 1131 and 1141 drop. Impulse sending relay 105 is deenergized, but does not drop immediately. Counting chain relay 1133 is energized over a circuit which has been traced previously.

At the control location, in response to the opening of the line circuit to transmit the third impulse, line relay 91 drops. Counting chain relays 731 and 741 drop. Counting chain relay 733 is energized over a circuit which has been traced previously.

At the remote location, impulse sending relay 105 drops to terminate the third impulse. Line relay 101 is energized, and impulse sending relay 105 is again energized. Counting chain relay 1143 is energized in series with relay 1133.

1142 pulls: —, 1133, 1133d, 1143, 1141b, 109c, 107a, +

At the control location, in response to the termination of the third impulse, line relay 91 is energized. Counting chain relay 743 is energized in series with relay 733.

743 pulls: —, 733, 733b, 743, 741a, 98b, f947c, b919c, +

At the remote location, in response to the energization of impulse sending relay 105, line relay 101 drops on the transmission of the fourth and last impulse of the valve open and preset to close code. Counting chain relays 1132 and 1142 drop. Impulse sending relay 105 is deenergized, but does not drop promptly. Counting chain relay 1134 is energized over a circuit which has been traced previously.

Supervision code control relay 1047 is now energized.

1047 pulls: —, 1047, 1046b, b1047a, 107b, b1148, f1149a, f1150a, f1134c, b1135e, b1136c, b1137c, b1138c, b1139c, b1140c, b104b, b1021a, f1018b, f1019b, f1923c, +

Relay 1047 holds at f1947a.

Point code and start relay 13K2 is now energized.

13K2 pulls: —, f13H2a, f13J2e, 13K2, f13J2d, f13H2b, 13G2e, 60, 1047c, 107b, b1148, f1149a, f1150a, f1134c, b1135e, b1136c, b1137c, b1138c, b1139c, b1140c, b104b, b1021a, f1018b, f1019b, f1023c, +

Relay 13K2 holds at f13K2b.

Impulse sending relay 105 finally drops, and group code relay 1431 is deenergized. It drops.

At the control location in response to the pulling of impulse sending relay 105 to transmit the fourth impulse of the preset to close code line relay 91 drops and counting chain relays 732 and 742 also drop. Counting chain relay 734 is energized over a previously traced circuit.

At the remote location the impulse sending relay 105 drops, as stated, to terminate the transmission of the fourth impulse of the valve open and preset to close code. Line relay 101 is energized, and as a result sending control relay 106 drops. Counting chain relay 1141 is energized in series with relay 1134.

1141 pulls: —, 1134, 1134b, 1141, 1142b, 109c, 107a, +

As a further result of the dropping of relay 106, sending drive relays 108 and 107 are deenergized and relay 107 drops. Counting chain relays 1133 and 1143 drop as do counting chain relays 1134 and 1141. Relay 108 now drops.

At the control location the fourth and last impulse is terminated by the closing of the line circuit on dropping of impulse sending relay 105, and line relay 91 is energized. Receiving relay 92 is deenergized, but does not drop immediately. Counting relay 741 is energized in series with relay 734.

741 pulls: —, 734, 734b, 741, 742a, 98b, f947c, b919c, +

Counting chain relays 733 and 743 drop and finally receiving relay 92 drops.

The deenergization of receiving relay 92 opens the energizing circuit for time delay relay 811. Since the transmission of codes has ceased, relay 811 is not reenergized at this time. It drops and opens the energizing circuit for relay 812, which is deenergized.

Supervision control relay 730 is now energized.

730 pulls: —, 730, f947a, f911c, 93c, b92d, +

Indication control relay 554 is now energized.

554 pulls: —, 554, 730d, f734a, b735a, b736a, b737a, b738a, b739a, b740a, f94b, +

Indication control relay 557 is also energized.

557 pulls: —, 557, b553f, b3E2d, b3D2c, f3C2c, 3A2g, 554e, +

Lamp relay 3E2 is now energized as a result of the energization of relays 554 and 557.

3E2 pulls: +, 3E2, 3A2b, 551a, 554d, 60, —

Release relay 548 is now energized.

548 pulls: —, 548, f554f, f3E2d, b3D2c, f3C2c, 3A2g, 554e, +

Relay 548 holds at f548a. Relay 557 drops.

As a result of the energization of lamp relay 3E2, a circuit is completed at 3E2a through b3B1a for energizing the white preset lamp associated with point 2 from the 45 volt alternating current source.

A result of the energization of release relay 548 is to complete a circuit for energizing point code and start relay 1F2.

1F2 pulls: +, 1CK2b, lower winding 1F2, 3A2a, f548c, b145a, f746a, 554a, 60, —

A further result of the energization of release relay 548 is to complete an energizing circuit for reset control release relay 950.

950 pulls: —, 950, f920b, f548b, +

As a result of the energization of reset control release 950 a circuit is completed at f950a for energizing time delay relay 812. Also impulse sending relay 95 is energized.

95 pulls: —, 95, f950c, +

The energization of impulse sending relay 95 opens the line circuit to transmit the single long impulse of the reset code.

At the remote location, line relay 101 drops and deenergizes reset relay 1051. When the line relay 101 was deenergized in response to transmission and receipt of short code impulses reset relay 1051 was deenergized. However, since it is an extra-slow-to-release relay, it does not drop during the time when line relay 101 is dropped, but is again energized shortly thereafter on reclosing of the line circuit. A further result of the dropping of line relay 101 is to complete the previously traced circuit for energizing counting chain relay 1131. Receiving relay 102 also is energized.

102 pulls: —, 102, b108a, 106c, 1051b, b101a, +

At the end of the predetermined interval, reset relay 1051 drops and as a result the following relays drop, since the circuit to positive battery is opened at f1051a and the following relays which are energized from positive through 109a are deenergized: Receiving relay 102, start relay 1023, supervision code control relays 1046 and 1047, group code relay 1015, group check relay 1016, point code relay 1018, point check relay 1019, counting chain relay 1131, group selection relay 12T1, point selection relay 13G2 and supervision code control relays 1149 and 1150.

As a result of the dropping of reset relay 1051, time delay relay 1010 is energized.

1010 pulls: —, 1010, b1051a, +

An obvious energizing circuit is completed at 1010a for energizing relay 1052.

At the control location in response to the energization of impulse sending relay 95 and the opening of the line circuit to transmit the long impulse of the reset code, line relay 91 drops.

Group code relay 231 drops as a result of the energization of point code and start relay 1F2.

Since the line relay 91 remains deenergized during the long impulse of the reset code, reset relay 951 is deenergized and drops. Previously this relay has been deenergized each time that line relay 91 dropped, but the time of deenergization was not sufficient to permit reset relay 951 to drop. Now that the long impulse of the reset code is being transmitted, it drops. At contacts 951b the circuit connecting positive battery to the circuit indicated by the plus sign, surrounded by the single circle, is opened. Consequently, all relays which were energized over 951b are deenergized. These relays are: Reset control relay 950, start relays 921 and 922, operation code control relay 947, counting chain relays 734 and 741, supervision control relay 730, group stop relay 914, group code relay 915, point stop relay 917, point code relay 918, indication control relay 554, release relay 548, operation code control relay 746, point selection relay 3A2 and group selection relay 6T1. The normal lamp 2NL is extinguished as a result of the deenergiation of start relay 922.

Slow-to-release reset relay 950 finally drops and opens the energizing circuit for impulse sending relay 95. A further result of the dropping of reset relay 950 is to open the energiing circuit for time relay relay 812.

Impulse sending relay 95 finally drops to close the line circuit and terminate the transmission of the long impulse of the reset code. Line relay 91 is energized and it in turn energizes reset relay 951.

Time delay relay 912 drops and opens the energizing circuit for relay 813. After the predetermined intervals it drops. Time delay relays 237 and 238 drop in sequence.

At the remote location, as a result of the termination of the long impulse of the reset code line relay 101 is energized. It energizes reset relay 1051. This in turn deenergizes time delay relay 1010. It drops and opens the energizing circuit to relay 1052, which finally drops.

At the control location the white and red lamps associated with point 2 are lighted. This signifies to the operator that the valve associated with this point is open, and is preset to be closed. The equipment has come to rest, and awaits further action by the operator.

With a view to condensing the description of the functioning of the invention, sequence charts will now be used to describe the same. In these charts the circuits are not traced but there is set forth an indication of the operation of the relays at both the control location and the remote location. From what has gone before, it is unnecessary to trace the circuits since, for illustrative purposes, they have been traced for presetting the valve on point 2 to close and additional circuit tracing would, to a large extent, be a duplication.

*Description of sequence charts*

The following notation is used in the relay operating sequence charts:

\*95\*97\*98  Indicates that relay 95, relay 97, and relay 98 operate, or energize.

−731−741  Indicates that relay 731 and relay 741 release, or deenergize.

(−95)  Indicates that relay 95 is a slow-to-release relay. The symbol (−95) indicates the time when the relay coil is deenergized. Then after an interval the relay contacts open.

−95

: A vertical line of dots indicates that current is flowing over the line circuit. The line wire circuit is normally energized. Impulses are transmitted by momentarily deenergizing the line. In the sequence charts codes of impulses appear as breaks in the vertical line of dots.

In the sequence charts, operations which are occurring at the same time at both the control location and the remote location are shown directly opposite each other on the same horizontal line.

As an illustration, the following portion of a typical sequence chart is described in detail:

| Control location: | |
|---|---|
| *91*951*920 *3F2*3C2* Red Lamp No. 2 *3F3*3D3* Green Lamp No. 3 | Relays 91, 951, 920, 3F2, 3C2, 3F3 and 3D3 are energized. The red lamp for valve No. 2 and the green lamp for valve No. 3 are lighted. |
| *CK2 to close | The operator turns the control key for valve No. 2 to the "close" position. |
| −3F2 | Relay 3F2 is deenergized and drops. |
| *231 | Relay 231 energizes or pulls. |
| *921*922 | Relays 921 and 922 energize. |
| *96*2NL | Relay 96 energizes. The normal lamp 2NL lights. |
| *95*97*98 | Relays 95, 97 and 98 energize. |
| −91*811 | Relay 91 releases, relay 811 energizes. |
| (−95)*731*812 | Relays 731 and 812 energize. The coil of slow-to-release relay 95 is deenergized. |
| *914*813 | Relays 813 and 914 energize. |
| *237 | Relay 237 energizes. |
| −95*238 | Relay 95 finally releases. Relay 238 energizes. |
| *91 | Relay 91 energizes. |
| −96*741 | Relay 96 releases. Relay 741 energizes. |
| (−98)−97 | The coil of slow-to-release relay 98 is deenergized. Relay 97 is deenergized and drops. |

The following sequence charts are typical. The only difference between relay operations for the valves specified in these sequence charts and other valves being controlled is the number of impulses in the selection and check codes.

*Presetting valve on point 3 to open*

The operator at the control location now presets the valve on point 3 to close and the operations take place as follows:

| Control Location | Line | Remote Location |
|---|---|---|
| *1CK3 to open | | |
| −1F3 | | |
| *231 | | |
| *921 *922 | | |
| *96 *2NL | | |
| *95 *97 *98 | | |
| −91 *811 | | |
| (−95) *731 *812 | G S C | −101 |
| *914 *813 | R E O | *102 *1131 |
| *237 | O L D | *1023 |
| −95 *238 | U E E | *1010 |
| *91 | P C | *1052 |
| −96 *741 | T | *101 |
| (−98) −97 | I | (−102) *1141 |
| −731 −741 | O | *103 |
| −98 | N | *104 |
| (−811) | | −102 |
| | | *1226 |
| | | *12T1 |
| | | *1015 |
| | | −1131 −1141 |
| −811 | | −103 |
| (−812) | | −104 |
| | | *106 |
| | | *105 *107 *108 |
| −91 | | −101 |
| −812 *92 *731 | G C C | (−105) *1131 |
| *811 *924 | R H O | *1016 |
| *812 | O E D | −1226 |
| | U C E | −105 |
| | P K | *101 |
| *91 | | −106 *1141 |
| (−92) *741 | | (1−108) −107 |
| *93 | | −1131 −1141 |
| *94 | | −108 |
| −92 | | |
| *826 (−811) | | |
| *6T1 −924 | | |
| *915 | | |
| −731 −741 | | |
| −93 −811 | | |
| −94 −826 | | |
| *96 | | |
| *95 *97 *98 | | |
| −91 *811 | | −101 |
| (−95) *731 | P | *102 *1131 |
| | O | |
| −95 | I | |
| *91 | N | *101 |
| *95 *741 | T | *1141 |
| −91 | | −101 *103 |
| (−95) *732 | S | *1132 *104 |
| | E | |
| −95 | L | |
| *91 | E | *101 |
| *95 *742 | C | *1142 |
| −91 −731 −741 | T | −101 −1131 −1141 |
| (−95) *733 | I | *1133 |
| *917 | O | |
| | N | |
| −95 | C | |
| | O | |
| | D | |

| Control Location | Line | Remote Location |
|---|---|---|
| *91 | E | *101 |
| −96 *743 | | (−102) *1143 |
| (−98) −97 −732 −742 | | −1132 −1142 |
| −733 −743 | | |
| −98 | | −102 |
| (−811) | | *1228 |
| | | *13G3 |
| | | *1018 *1148 |
| −811 | | −1133 −1143 |
| | | −103 |
| | | −104 |
| −91 | | *106 |
| *92 *731 | | *105 *107 *108 |
| *924 *811 | P | −101 |
| | O | (−105) *1131 |
| | I | |
| *91 | N | −105 |
| *741 | T | *101 |
| −91 *93 | | *105 *1141 |
| *732 *94 | C | −101 |
| | H | (−105) *1132 |
| *91 | E | |
| *742 | C | −105 |
| −91 −731 −741 | K | *101 |
| *733 | | *105 *1142 |
| | C | −101 −1131 −1141 |
| | O | (−105) *1133 |
| *91 | D | *1019 |
| (−92) *743 | E | −1228 |
| −732 −742 | | |
| | | −105 |
| | | *101 |
| −92 | | −106 *1143 |
| *828 (−811) | | (−108) −107 −1132 |
| *3A3 −924 | | −1142 |
| *918 *745 | | −1133 −1143 |
| −732 −742 | | −8 |
| −93 −811 | | |
| −94 −828 | | |
| *96 | | |
| *95 *97 *98 | | |
| −91 *811 | | −101 |
| (−95) *731 | | *102 *1131 |
| −95 | | |
| *91 | | *101 |
| *95 *741 | O | *1141 |
| −91 | P | −101 *103 |
| (−95) *732 | E | *1132 *104 |
| | R | |
| −95 | A | |
| *91 | T | *101 |
| *95 *742 | I | *1142 |
| −91 −731 −741 | O | −101 −1131 −1141 |
| (−95) *733 | N | *1133 |
| *947 | | |
| −95 | C | |
| *91 | O | *101 |
| −96 *743 | D | (−102) *1143 |
| (−98) −97 −732 −742 | E | −1132 −1142 |
| −733 −743 | | |
| −98 | | −102 |
| (−811) | | *1030 |
| | | (−1010) −13J3 |
| | | −1150 −13K3 |
| | | *1431 |
| −811 | | −1010 |
| (−812) | | (−1052) |
| −812 | | −1052 |
| | | *1046 |
| | | −1030 −1133 −1143 |
| | | −103 |
| | | −104 |
| | | *106 |
| | | *105 *107 *108 |
| −91 | | −101 |
| *92 *731 | | (−105) *1131 |
| *811 | S | |
| *812 | U | −105 |
| | P | *101 |
| *91 | E | *105 *1141 |
| *741 | R | −101 |
| −91 *93 | V | (−105) *1132 |
| *732 *94 | I | |
| | S | −105 |
| | I | *101 |
| *91 | O | *105 *1142 |
| *742 | N | −010 −1131 −1141 |
| −91 −731 −741 | C | (−105) *1133 |
| *733 | O | |
| | D | −105 |
| *91 | E | *101 |
| *743 | | *105 *1143 |

| Control Location | Line | Remote Location |
|---|---|---|
| −91 −732 −742<br>*734 | | −101 −1132 −1142<br>(−105) *1134 |
| *91<br>*741<br>−91 −733 −743<br>*735 | | −105<br>*101<br>*105 *1141<br>−101 −1133 −1143<br>(−105) *1135 |
| *91<br>*742<br>−91 −734 −741<br>*736 | | −105<br>*101<br>*105 *1142<br>−101 −1134 −1141<br>(−105) *1136<br>*1047<br>*13K3<br>−105 −1431 |
| *91<br>(−92) *743<br>−735 −742 | | *101<br>−106 *1143<br>(−108) −107 −1135<br>−1142<br>−1136 −1143<br>−108 |
| −92<br>*730 (−811)<br>*556<br>*557<br>*3E3<br>*548 *Preset Lamp −811<br>No. 3<br>*950 −557<br>*3F2 *95<br>−91 −231<br>(−951) | R E S E T C O D E | |
| −951<br>(−950) −921 −922 −947<br>−736<br>: −743 −730 −914 −915<br>: −917 −918 −556 −548<br>: −745 −3A3 −2NL | | −101<br>(−1051) *1131 *102<br>−1051<br>*1010 −1023 −1046<br>−1047<br>−1015 −1016 −1018<br>−1019<br>*1052 −1131 −12T1<br>−13G3<br>−1148<br>(−102)<br>−102 |
| −950<br>(−95) (−812) | | |
| −95<br>*91 −812<br>*951 (−813) | | *101<br>*1051<br>(−1010) |
| −813<br>(−237) | | −1010<br>(1052) |
| −237<br>(−238) | | −1052 |
| −238 | | |

The white and green indicating lamps on point 3 are now lighted signifying that the valve controlled by this point is closed and is preset to be opened. The equipment has come to rest and awaits further action by the operator.

As previously stated, the operator at the control location can preset other valves on other points to close or open as the case may be. Thus, he may preset ten valves to close and fifteen to open. The presetting operations will take place for each point essentially as described for points 2 and 3.

The manner in which the operator effects simultaneous closing of the valve on point 2 and opening of the valve on point 3 will now be described.

*Simultaneous operation of valves on points 2 and 3*

| Control Location | Line | Remote Location |
|---|---|---|
| *1CK1<br>*1FC1 *3D1<br>*231 *2TS<br>*921 *922 | | |

| Control Location | Line | Remote Location |
|---|---|---|
| *96 *2NL<br>*95 *97 *98<br>−91 *811<br>(−95) *731 *812<br>*914 *813<br>*237<br>−95 *238<br>*91<br>−96 *741<br>(−98) −97<br>−731 −741<br>−98<br>(−811) | G R O U P S E L E C T I O N C O D E | −101<br>*102 *1131<br>*1023<br>*1010<br>*1052<br>*101<br>(−102) *1141<br>*103<br>*104<br>−102<br>*1226<br>*12T1<br>*1015<br>−1131 −1141<br>−103<br>−104<br>*106<br>*105 *107 *108 |
| −811<br>(−812)<br>−91<br>−812 *92 *731<br>*811 *924<br>*812 | G R O U P C H E C K C O D E | −101<br>(−105) *1131<br>*1016<br>−1226<br>−105<br>*101<br>−106 *1141<br>(−108) −107<br>−1131 −1141<br>−108 |
| *91<br>(−92) *741<br>*93<br>*94<br>−92<br>*826 (−811)<br>*6T1 −924<br>*915<br>−731 −741<br>−93 −811<br>−94 −826<br>*96<br>*95 *97 *98<br>−91 *811<br>(−95) *731<br>*917 | P O I N T S E L E C T I O N C O D E | −101<br>*102 *1131<br>*101<br>(−102) *1141<br>*103<br>*104<br>−102<br>*1228<br>*13G1<br>*1018<br>−1131 −1141<br>−103<br>−104<br>*106<br>*105 *107 *108 |
| −95<br>*91<br>−96 *741<br>(−98) −97<br>−731 −741<br>−98<br>(−811)<br>−811 | | |
| −91<br>*102 *731<br>*924 *811<br>*91<br>(−92) *741<br>*93<br>*94<br>−92<br>*828 (−811)<br>*3A1 −924<br>*918 *746<br>−731 −741<br>−93 −811<br>−94 −828<br>*96<br>*95 *97 *98<br>−91 *811<br>(−95) *731 | P O I N T C H E C K C O D E | −101<br>(−105) *1131<br>*1019<br>−105 −1228<br>*101<br>−106 *1141<br>(−108) −107 −1131<br>−1141<br>−108 |
| −95<br>*91<br>*95 *741<br>−91<br>(−95) *732 | C O N T R O L O P E R A T I O N C O D E | −101<br>*102 *1131<br>*101<br>*1141<br>−101 *103<br>*1132 *104 |
| −95<br>*91<br>*95 *742<br>−91 −731 −741<br>(−95) *733 | | *101<br>*1142<br>−101 −1131 −1141<br>*1133 |
| −95<br>*91<br>*95 *743<br>−91 −732 −742<br>(−95) *734 | | *101<br>*1143<br>−101 −1132 −1142<br>*1134 |
| −95<br>*91<br>*95 *741<br>−91 −733 −743<br>(−95) *735<br>*947 | | *101<br>*1141<br>−101 −1133 −1143<br>*1135 |
| −95<br>*91 | | *101 |

| Control Location | Line | Remote Location |
|---|---|---|
| -106 *742<br>(-98) -97 -734 -741<br>     -735 -742<br>-98<br>(-811)<br>⋮<br>-811<br>(-812)<br>⋮<br>-812 | CODE SUPERVISION | (-102) *1142<br>     -1134 -1141<br>-102<br>*1030<br>(-1010) *13H1<br>     *13IRC2 Valve<br>       starts to close<br>     *13IRO3 Valve<br>       starts to open<br>-1010<br>⋮<br>-1052<br>*1046<br>-1030 -1135 -1142<br>-103 -13H1<br>-104<br>*106 -13JRC2<br>     -13IRO3<br>*105 *107 *108<br>-101<br>(-105) *1131<br>⋮<br>-105<br>*101<br>*105 *1141<br>-101<br>(-105) *1132<br>     *1047<br>⋮<br>-105<br>*101<br>-106 *1142<br>(-108) -107 -1131<br>               -1141<br>     -1132 -1142<br>-108 |
| -91<br>*92 *731<br>*811<br>*812<br>⋮<br>*91<br>*741 *93<br>-91 *93<br>*732 *94<br>⋮<br>*91<br>(-92) *742   (-811)<br>     -731 -741<br>⋮<br>-92<br>*730<br>*552         -811<br>*548<br>*950<br>*95 -1FC1<br>-91 -231<br>(-951)<br>⋮<br>-951<br>(-950) -921 -922 -947<br>     -732<br>-742 -730 -914 -915<br>-917 -918 -552 -548<br>-746 -3A1 -2NL<br>-950<br>(-95) (-812)<br>⋮<br>-95<br>*91 -812<br>*951 (-813)<br>⋮<br>(-237)<br>     -813<br>⋮<br>-237<br>(-238)<br>⋮<br>-238 | RESET CODE | -101<br>(-1051) *1131 *102<br>⋮<br>-1051<br>*1010 -1023 -1046<br>          -1047<br>-1015 -1016<br>*1052 -1018 -1019<br>          -1131<br>-12T1<br>-13G1<br>(-102)<br>⋮<br>-102<br>*101<br>*1051<br>(-1010)<br>⋮<br>-1010<br>(-1052)<br>⋮<br>-1052 |

The valve on point 2 has now started to close and the valve on point 3 has started to open. As soon as each valve leaves its open or close position, both of its auxiliary switch contacts are closed. The manner in which the new valve positions are reported to the control location will now be set forth.

*Valve on point 2 reports leaving open position*

| Control Location | Line | Remote Location |
|---|---|---|
|  |  | *13ASC2<br>-13H2<br>-13K2<br>*1431<br>*1021 *1022<br>*106<br>*105 *107 *108 |

| Control Location | Line | Remote Location |
|---|---|---|
| -91<br>*92 *731<br>*923 *811<br>*812 *2NL<br>*813<br>*91 *237<br>(-92) -741 *238<br>     *93<br>     *94<br>-92<br>*826<br>*6T1      (-811)<br>*915<br>-731 -741<br>-93 -811<br>-94<br>*96<br>*95 *97 *98<br>-91 *811<br>(-95) *731<br>*916<br>-826<br>-95<br>*91<br>-96 -741<br>(-98) -97<br>     -731 -741<br>-98<br>(-811)<br>⋮<br>-811<br>⋮<br>-91<br>*92 *731<br>⋮<br>*91<br>*741<br>-91 *93<br>*732 *94<br>⋮<br>*91<br>(-92) *742<br>     -731 -741<br>⋮<br>-92<br>*828      (-811)<br>*3A2<br>*918 -3F2<br>-732 -742<br>-93 *231 -811<br>-94<br>*96<br>*95 *97 *98<br>-91 *811<br>(-95) *731<br>-95<br>*91<br>*95 *741<br>-91<br>(-95) *732<br>     *919<br>     -828<br>-95<br>*91<br>-96 *742<br>(-98) -97 -731 -741<br>     -732 -742<br>-98<br>(-811)<br>⋮<br>-811<br>⋮<br>-91<br>*92 *731<br>⋮<br>*91<br>*741<br>-91 *93<br>*732 *94<br>⋮<br>*91<br>(-92) *742<br>     -731 -741<br>-92 | GROUP SELECTION CODE<br><br>GROUP CHECK CODE<br><br>POINT SELECTION CODE<br><br>POINT CHECK CODE<br><br>CODE SUPERVISION | -101<br>(-105) *1131<br>     *1014<br>⋮<br>-105<br>*101<br>-106 *1141<br>(-108) -107<br>     -1131 -1141<br>-108<br>⋮<br>-101<br>*102 *1141<br>⋮<br>*101<br>(-102) *1141<br>     *103<br>     *104 *1024<br>-102<br>*1226<br>*12T1 -1024<br>*1015<br>-1131 -1141<br>-103<br>-104 -1226<br>*106<br>*105 *107 *108<br>-101<br>(-105) *1131<br>⋮<br>-105<br>*101<br>*105 *1141<br>-101<br>(-105) *1132<br>     *1017<br>⋮<br>-105<br>*101<br>-106 *1142<br>(-108) -107 -1131<br>               -1141<br>          -1132<br>          -1142<br>-108<br>⋮<br>-101<br>*102 *1131<br>⋮<br>*101<br>*1141<br>-101 *103<br>*1132 *104 *1024<br>⋮<br>*101<br>(-102) *1142<br>     -1131 -1141<br>-102<br>*1228<br>*13G2 -1024<br>*1018 *1046<br>*1148 *1149 *1150<br>-1132 -1142<br>-103<br>-104 -1228<br>*106<br>*105 *107 *108<br>-101<br>(-105) *1131<br>⋮<br>-105<br>*101<br>*105 *1141<br>-101<br>(-105) *1132<br>     *1047<br>     *13K2<br>-105 -1431<br>*101<br>-106 *1142<br>(-108) -107 -1131<br>          -1141<br>-108 -1132 -1142 |

| Control Location | Line | Remote Location |
|---|---|---|
| *730 (-811)<br>*552<br>*557<br>*3D2<br>*548 -811 *Red Lamp No. 2<br>*950 -557<br>*3F2 *95<br>-91 -231<br>(-951)<br>⋮<br>-951<br>(-950) -923 -6T1 -916<br>⋮ -918<br>⋮ -3A2 -919 -730<br>-552<br>-548 -2NL<br>-915<br>-732 -742<br>⋮<br>-950<br>(-95) (-812)<br>⋮<br>-95<br>*91 -812<br>*951 (-813)<br>⋮<br>-813<br>(-237)<br>⋮<br>-237<br>(-238)<br>⋮<br>-238 | R E S E T    C O D E | ⋮<br>-101<br>(-1051) *1131 *102<br>⋮<br>(-1051)<br>*1010 -1021 -1022<br>⋮ -1014 -1015<br>*1052 -12T1 -1017<br>⋮ -13G2<br>-1018 -1046 -1148<br>⋮ -1149<br>-1150 (-102)<br>-1047<br>⋮<br>-102<br>⋮<br>*101<br>*1051<br>(-1010)<br>⋮<br>-1010<br>(-1052)<br>⋮<br>-1052 |

The red, green and white indicating lamps on point 2 all are lighted signifying that the valve on this point is somewhere between full open and full close position.

*Valve on point 3 reports leaving close position*

| Control Location | Line | Remote Location |
|---|---|---|
| ⋮<br>-91<br>*92 *731<br>*923 *811<br>*812 *2NL<br>*813<br>*91 *237<br>(-92) *741 *238<br>⋮ *93<br>⋮ *94<br>-92<br>*826 (-811)<br>*6T1<br>*915<br>-731 -741<br>-93 -811<br>-94<br>*96<br>*95 *97 *98<br>-91 *811<br>(-95) *731<br>⋮ *916<br>⋮ -826<br>-95<br>*91<br>-96 *741<br>(-98) -97<br>⋮ -731 *741<br>-98<br>(-811)<br>⋮<br>-811<br>⋮<br>-91<br>*92 *731<br>*811 | G R O U P   S E L E C T I O N   C O D E<br><br>G R O U P   C H E C K   C O D E<br><br>P O I N T   S E L E C   C O D E | *13ASO3<br>-13H3<br>-13K3<br>*1431<br>*1021 *1022<br>*106<br>*105 *107 *108<br>-101<br>(-105) *1131<br>⋮ *1014<br>⋮<br>-105<br>*101<br>-106 *1141<br>(-108) -107<br>⋮ -1131 -1141<br>-108<br>⋮<br>-101<br>*102 *1131<br>⋮<br>*101<br>(-102) *1141<br>⋮ *103<br>⋮ *104 *1024<br>-102<br>*1226<br>*12T1 -1024<br>*1015<br>-1131 -1141<br>-103<br>-104 -1226<br>*106<br>*105 *107 *108<br>-101<br>(-105) *1131<br>⋮<br>-105 |

| Control Location | Line | Remote Location |
|---|---|---|
| *91<br>*741<br>-91 *93<br>*732 *94<br>⋮<br>*91<br>*742<br>-91 -731 -741<br>*733<br>⋮<br>*91<br>(-92) *743<br>⋮ -732 -742<br>⋮<br>-92<br>*828 (-811)<br>*3A3<br>*918 -3F3<br>-733 -743<br>-93 *231 -811<br>-94<br>*96<br>*95 *97 *98<br>-91<br>(-95) *731<br>⋮<br>-95<br>*91<br>*95 *741<br>-91<br>(-95) *732<br>⋮<br>-95<br>*91<br>*95 *742<br>-91 -731 -741<br>(-95) *733<br>⋮ *919<br>⋮ -828<br>-95<br>*91<br>-96 *743<br>(-98) -97 -732 -742<br>⋮ -733 -743<br>-98<br>(-811)<br>⋮<br>-811<br>⋮<br>-91<br>*92 *731<br>*811<br>⋮<br>*91<br>*741<br>-91 *93<br>*732 *94<br>⋮<br>*91<br>(-92) *742<br>⋮ -731 -741<br>⋮<br>-92<br>*730 (-811)<br>*552<br>*557<br>*3O2<br>*548 -811 *Red Lamp No. 3<br>*950 -557<br>*3F3 *95<br>-91 -231<br>(-951)<br>⋮<br>-951<br>(-950) -923 -6T1 -916<br>⋮<br>-918 -3A3 -919<br>-730 -552<br>⋮<br>-548 -2NL -915<br>-732 -742<br>⋮<br>-950<br>(-95) (-812)<br>⋮<br>-95<br>*91 -812 | T I O N    <br><br>P O I N T   C H E C K   C O D E<br><br>S U P E R V I S I O N   C O D E<br><br>R E S E T   C O D E | *101<br>*105 *1141<br>-101<br>(-105) *1132<br>⋮<br>-105<br>*101<br>*105 *1142<br>-101 -1131 -1141<br>(-105) *1133<br>⋮ *1017<br>⋮<br>-105<br>*101<br>-106 *1143<br>(-108) -107 -1132<br>⋮ -1142<br>⋮ -1133 -1143<br>-108<br>⋮<br>-101<br>*102 *1131<br>⋮<br>*101<br>*1141<br>-101 *103<br>*1132 *104 *1024<br>⋮<br>*101<br>*1142<br>-101 -1131 -1141<br>*1133<br>⋮<br>*101<br>(-102) *1143<br>⋮ -1132 -1142<br>-102<br>*1228<br>*13G3 -1024<br>*1018 *1046 *1148<br>⋮ *1149<br>-1133 -1143<br>-103<br>-104 -1228<br>*106<br>*105 *107 *108<br>-101<br>(-105) *1131<br>⋮<br>-105<br>*101<br>*105 *1141<br>-101<br>(-105) *1132<br>⋮ *1047<br>⋮ *13K3<br>-105 -1431<br>*101<br>-106 *1142<br>(-108) -107 -1131<br>⋮ -1141<br>⋮ -1132 -1142<br>-108<br>⋮<br>-101<br>(-1051) *1131 *102<br>⋮<br>-1051<br>*1010 -1021 -1022<br>⋮ -1046 -1047<br>⋮ -1014 -13G3<br>*1052 -12T1 -1015<br>⋮ -1017 -1018<br>-1148 -1149<br>⋮<br>(-102)<br>⋮<br>-102<br>⋮<br>*101 |

| Control Location | Line | Remote Location |
|---|---|---|
| *951 (−813) | ⋮ | *1051 (−1010) |
| −813 (−237) | ⋮ | −1010 (−1052) |
| −237 (−238) | ⋮ | |
| −238 | ⋮ | −1052 |

The red, green and white indicating lamps on point 3 all are lighted signifying that the valve on this point is somewhere between full open and full close position.

Now it will be assumed that the valve on point 2 reaches the full close position before the valve on point 3 reaches the full open position. The indication is reported in the following manner:

*Valve on point 2 reports reaching full close position*

| Control Location | Line | Remote Location |
|---|---|---|
| | ⋮ | −13ASO2 −13H2 −13K2 *1431 *1021 *1022 *106 *105 *107 *108 |
| −91 *92 *731 *923 *811 *812 *2NL *813 *91 *237 (−92) *741 *238 ⋮ *93 ⋮ *94 −92 *826 (−811) *6T1 *915 −731 −741 −93 −811 −94 *96 *95 *97 *98 −91 *811 (−95) *731 ⋮ *916 ⋮ −826 −95 *91 −96 *741 (−98) −97 ⋮ −731 −741 −98 (−811) ⋮ −811 | G R O U P / S E L E C T I O N / C O D E | −101 (−105) *1131 ⋮ *1014 −105 *101 −106 *1141 (−108) −107 −1131 −1141 −108 |
| | G R O U P / C H E C K / C O D E | −101 *102 *1131 *101 (−102) *1141 ⋮ *103 ⋮ *104 *1024 −102 *1226 *12T1 −1024 *1015 −1131 −1141 −103 −104 −1226 *106 *105 *107 *108 −101 (−105) *1131 −105 *101 *105 *1141 −101 (−105) *1132 ⋮ *1017 −105 *101 −106 *1142 (−108) −107 −1131 −1141 −1132 −1142 −108 |
| −91 *92 *731 *811 *91 *741 −91 *93 *732 *94 *91 (−92) *742 ⋮ −731 −741 −92 *828 (−811) *3A2 *918 −3F2 −732 −742 −93 *231 *811 −94 *96 *95 *97 *98 −91 *811 | P O I N T / S E L E C T I O N / C O D E P C C | −101 |

| Control Location | Line | Remote Location |
|---|---|---|
| (−95) *731 −95 *91 *95 *741 −91 (−95) *732 ⋮ *919 ⋮ −828 −95 *91 −96 *742 (−98) −97 −731 −741 ⋮ −732 −742 −98 (−811) ⋮ −811 | | |
| −91 *92 *731 *811 *91 *741 −91 *93 *732 *94 *91 *742 −91 −731 −741 *733 *91 *743 −91 −732 −742 *734 *91 *741 −91 −733 −743 *735 *91 (−92) *742 ⋮ −731 −741 −92 (−811) *730 ⋮ *555 ⋮ *557 ⋮ −3C2 −3E2 −811 −White Lamp No. 2 *548 −Red Lamp No. 2 *950 −557 *3F2 *95 −91 −231 (−951) ⋮ −951 (−950) −923 −6T1 −916 −918 −3A2 −919 −730 −555 −548 −2NL −915 −735 −742 −950 (−95) (−812) −95 *91 −812 *951 (−813) −813 (−237) −237 (−238) −238 | O I N T / C H E C K / C O D E S U P E R V I S I O N / C O D E R E S E T / C O D E | *102 *1131 *101 *1141 −101 *103 *1132 *104 *1024 *101 (−102) *1142 ⋮ −1131 −1141 −102 *1228 *13G2 −1024 *1018 *1046 *1148 *1150 −1132 −1142 −103 −104 −1228 *106 *105 *107 *108 −101 (−105) *1131 −105 *101 *105 *1141 −101 (−105) *1132 −105 *101 *105 *1142 −101 −1131 −1141 (−105) *1133 −105 *101 *105 *1143 −101 −1132 −1142 (−105) *1134 −105 *101 *105 *1141 −101 −1133 −1143 (−105) *1135 *1047 *13K2 −105 −1431 *101 −106 *1142 (−108) −107 −1134 −1141 −1135 −1142 −108 −101 (−1051) *1131 *102 −1051 *1010 −1021 −1022 −1046 −1047 −1013 −1014 *1052 −12T1 −1017 −13G2 −1018 −1148 −1150 (−102) −102 *101 *1051 (−1010) −1010 (−1052) −1052 |

The green lamp only on point 2 now is lighted signifying that the valve on this point is closed.

As soon as the valve on point 3 reaches the open position it reports in the following manner:

*Valve on point 3 reports reaching full open position*

| Control Location | Line | Remote Location |
|---|---|---|
| | | -13ASC3 |
| | | -13H3 |
| | | -13K3 |
| | | *1431 |
| | | *1021  *1022 |
| | | *106 |
| | | *105  *107  *108 |
| -91 | | -101 |
| *92  *731 | G S C | (-105)  *1131 |
| *923  *811 | R E O | ⋮  *1014 |
| *812  *2NL | O L D |  |
| *813 | U E E | -105 |
| *91  *237 | P C   | *101 |
| (-91)  *731  *238 |   T  | -106  *1141 |
| ⋮  *93 |   I   | (-108)  -107 |
| ⋮  *94 |   O   | ⋮  -1131  -1141 |
| -92 |   N   | -108 |
| *826      (-811) | | |
| *6T1 | | |
| *915 | | |
| -731  -741 ⋮ | | |
| -93         -811 | | |
| -94 | | |
| *96 | | |
| *95  *97  *98 | | |
| -91  *811 | G C C | -101 |
| (-95)  *731 | R H O | *102  *1131 |
| ⋮  *916 | O E D |  |
| ⋮  -826 | U C E |  |
| -95 | P K   |  |
| *91 | | *101 |
| -96  *741 | | (-102)  *1141 |
| (-98)  -97 | | ⋮  *103 |
| ⋮  -731  -741 | | ⋮  *104  *1024 |
| -98 | | -102 |
| (-811) | | *1226 |
| ⋮ | | 12T1  -1024 |
| ⋮ | | *1015 |
| -811 | | -1131  -1141 |
| | | -103 |
| | | -104  -1226 |
| | | *106 |
| | | *105  *107  *108 |
| -91 | P S C | -101 |
| *92  *731 | O E O | (-105)  *1131 |
| *811 | I L D |  |
| | N E E | -105 |
| | T C E | *101 |
| *91 |   T   | *105  *1141 |
| *741 |   I   | -101 |
| -91  *93 |   O   | (-105)  *1132 |
| *732  *94 |   N   |  |
| | | -105 |
| | | *101 |
| *91 | | *105  *1142 |
| *742 | | -101  -1131  -1141 |
| -91  -731  -741 | | (-105)  *1133 |
| *733 | | ⋮  *1017 |
| | | -105 |
| | | *101 |
| *91 | | -106  *1143 |
| (-92)  *743 | | (-108)  -107  -1132 |
| ⋮  -732  -742 | | ⋮       -1142 |
| | | ⋮  -1133  -1143 |
| -92 | | -108 |
| *828      (-811) | | |
| *3A3 | | |
| *918  -3F3 ⋮ | | |
| -733  -743 | | |
| -93  *231  -811 | | |
| -94 | | |
| *96 | | |
| *95  *97  *98 | | |
| -91 | P C C | -101 |
| (-95)  *731 | O H O | *102  *1131 |
| ⋮ | I E D |  |
| -95 | N C E |  |
| *91 | T K   | *101 |
| *95  *741 | | *1141 |
| -91 | | -101  *103 |
| (-95)  *732 | | *1132  *104  *1024 |
| ⋮ | | |
| -95 | | |
| *91 | | *101 |
| *95  *742 | | *1142 |
| -91  -731  -741 | | -101  -1131  -1141 |
| (-95)  *733 | | *1133 |
| ⋮  *919 | | |
| ⋮  -828 | | |
| -95 | | |
| *91 | | *101 |
| -96  *743 | | (-102)  *1143 |
| (-98)  -97  -732  -742 | | ⋮  -1132  -1142 |
| ⋮  -733  -743 | | |
| -98 | | -102 |

| Control Location | Line | Remote Location |
|---|---|---|
| (-811) | | *1228 |
| ⋮ | | *13G3  -1024 |
| -811 | | *1018  *1046  *1149 |
| | | -1133  -1143 |
| | | -103 |
| -91 | | -104  -1228 |
| *92  *731 | | *106 |
| *811 | | *105  *107  *108 |
| | | -101 |
| *91 | S C | (-105)  *1131 |
| 741 | U O |  |
| -91  *93 | P D | -105 |
| *732  *94 | E E | *101 |
| | R   | *105  *1141 |
| *91 | V   | -101 |
| *742 | I   | (-105)  *1132 |
| -91  -731  -741 | S   |  |
| *733 | I   | -105 |
| | O   | *101 |
| *91 | N   | *105  *1142 |
| (-92)  *743 | | -101  -1131  -1141 |
| ⋮  -732  -742 | | (-105)  *1133 |
| | | ⋮  *1047 |
| -92 | | ⋮  *13K3 |
| (-811)  *730 | | -105  -1431 |
| ⋮  *553 | | *101 |
| ⋮  *557 | | -106  *1143 |
| ⋮  -3D3  -3E3 | | (-108)  -107  -1132 |
| -811  -White Lamp No. 3 | | ⋮       -1142 |
| *548  -Green Lamp No. 3 | | ⋮  -1133  -1143 |
| *950  -557  -3D1 | | -108 |
| *3F3  *95  -2TS | | |
| -91  -231 | | |
| (-951) | | |
| ⋮ | R C | -101 |
| ⋮ | E O | (-1051)  *1131  *102 |
| -951 | S D |  |
| (-950)  -923  -6T1  -916 | E E | -1051 |
| ⋮ | T   | *1010  -1021  -1022 |
| ⋮  -918  -3A3  -919 | | ⋮       -1014  -1046 |
| ⋮  -730  -553 | | -1047  -1015 |
| ⋮  -548  -2NL  -915 | | *1052  -12T1  -1017 |
| ⋮  -733  -743 | | ⋮             -13G3 |
| | | -1018  -1149 |
| -950 | | (-102) |
| (-95)  (-812) | | |
| ⋮ | | -102 |
| -95 ⋮ | | |
| *91  -812 | | |
| *951  (-813) | | *101 |
| | | *1051 |
| ⋮ | | -1010 |
| ⋮  -813 | | |
| (-237) | | -1010 |
| ⋮ | | (-1052) |
| ⋮ | | |
| -237 | | |
| (-238) | | -1052 |
| ⋮ | | |
| -238 | | |

The red indicating lamp on point 3 now is lighted, signifying that the valve on this point is open. The equipment is now in the normal or at rest position, and awaits further action by the operator, or the initiation of an action at the remote location.

*Stopping control*

When a valve control operation, initiated at the control location, is performed, all of the valves which have been preset will start to operate. In a particular application of the present invention, it has been found that on the average a valve takes about one minute to travel from one extreme position to the other. At any time during this interval, the operator at the control location can stop all of the valves which are in operation by operating the stop key 1SK1.

When the stop key 1SK1 is operated, the equipment will start to operate in the same manner as it does when the control key 1CK1 is operated. If the stop key 1SK1 should be operated while a valve indication is being reported, the stopping operation will be delayed until the valve indication is completed. In the equipment used in practicing this invention, this delay would be not more than three seconds.

An operation of stop key 1SK1, after the group selection, group check, point selection and point check codes are completed, similar to the action which takes place for valve control operation, operation code control relay 745 is energized at the control location, instead of operation code control relay 746, as was the case for a valve control operation. This will cause an operation code of three impulses to be transmitted to effect the stopping control as contrasted with the operation code of five impulses for effecting the valve control operation.

The reception of the operation code of three impulses at the remote location effects the energization of operation relay 13J1, and stop interposing relay 13S1 will be energized, or all of them will be energized if one is provided for each valve, thereby causing all of the valves to stop. From the remote control location there will then be transmitted a supervision code of two impulses, after which the equipment will reset.

When the stop key 1SK is operated, relay 3C1, which is an auxiliary stopping relay, is energized, and it resets the time switch 2TS. As soon as all of the valves have reported as being in the intermediate position, auxiliary stopping relay 3C1 and alarm cut-out relay 3D1 are deenergized, and they drop.

*Time switch operation*

Whenever a valve at the remote location changes its position, the alarm bell 2AB will ring and the alarm lamp 2AL will flash at the control location. The manner in which this is accomplished will be described hereinafter.

The indicating lamp for the valve which changed position and corresponding to the new position thereof also will flash. The time switch 2TS is used to disconnect the alarm circuit for a short time when a control operation is being performed, so that no alarm will be given when a valve is intentionally operated by the operator from the control location. The timing interval may be about 110 seconds, since indications are received at the control location for slightly less than that time after a control operation is performed, since each valve attempts to report as soon as it leaves one extreme position, and also reports again when it reaches the other extreme position.

When the control key 1CK1 is operated, alarm cut-out relay 3D1 is energized and it holds. This relay opens the circuit to the alarm bell relay 710, and lamp flashing relays 758, 759 and 760. As a result of the energization of alarm cut-out relay 3D1, time switch 2TS is energized. When the end of the interval for which the time switch 2TS is set occurs, it closes its contact and energizes alarm restoring relay 3B1. This relay releases relay 3D1, thereby resetting the alarm circuits, and also resetting the time switch 2TS.

If all of the valves which have been preset have operated, all of the lamp relays 3E2, 3E3, etc., will be deenergized, and alarm restoring relay 3B1 will release as soon as alarm cut-out relay 3D1 operates. If one of the valves has failed to operate during the period measured by the time switch 2TS, relay 3B1 will remain energized and will connect the white preset lamp for the valve that has failed to operate to the lamp flashing circuit. Operation of the alarm key 2AK releases relay 3B1 and stops the flashing of the preset lamp.

*Automatic reset*

The system disclosed herein is provided with an automatic reset which will reset the equipment and automatically start the operation over again if an unduly long time interval should elapse between the performance of the various parts of an operation. The automatic reset is controlled by time delay relays 811, 812, 813, 237 and 238 at the control location. It will be recalled that for a valve control operation initiated at the control location, these relays are energized at the beginning of each operation, and are held energized as long as the control location equipment is either sending or receiving impulses. The relays of this relay chain start to release in the interval between the completion of one code of impulses, and the starting of the next code of impulses in the normal operation and sequence. It will be observed that, in normal operation, this time interval is long enough to allow time delay relay 811 and possibly time delay relay 812 to drop. However, the other relays of this relay chain do not drop under normal conditions, while code impulses are being transmitted or received.

If, after either the control location or the remote location has completed sending a code of impulses, about one-half second should elapse without the other equipment starting the next code of impulses, relays 811, 812, 813 and 237 have time to drop. As soon as relay 237 drops, it energizes reset control relay 950, and this relay initiates the transmission of a reset impulse, thereby causing the equipment at each of the locations to reset. After resetting, the operation which had been interrupted will be restarted automatically, since the point code and start relay 1F2, for example, will still be deenergized if the operation had been initiated on point 2 at the control location, or the point, code and start relay 13K2, for example, will still be deenergized if the operation had been initiated at point 2 at the remote location.

*Manual reset*

Reset key 2RK is provided for manually restoring the system to normal, in the event it should jam or accidentally stop during an operation as a result of a momentary failure of a part of the equipment. The operation of reset key 2RK causes the transmission of a long impulse so as to release reset relay 951 at each location. In turn, this releases all of the relays that are energized by connection to the positive battery through the contacts of these relays. The operation being performed will then restart for the reasons stated hereinbefore with respect to the automatic reset of the equipment.

*Supervision at point 5*

It will be assumed that the apparatus unit, such as a blower, on point 5 stops running for some reason, and its energizing contactor is open. The fact that it was previously running is indicated at the control location, by the red indicating lamp associated with point 5 being lighted. The manner in which the changed condition of the blower on point 5 is indicated at the control location will now be set forth:

| Control Location | Line | Remote Location |
|---|---|---|
| *920 *3F5 *3D5<br>*91 *951 *Red Lamp No. 5<br><br>-91<br>*92 *731<br>*723 *811<br>*812 *2NL<br>*813<br>*91 *237<br>(-92) *238 *741<br>⋮ *93<br>⋮ *94<br>-92<br>*826<br>*6T1 (-811)<br>*915<br>-731 -741<br>-93<br>-94 -811<br>*96<br>*95 *97 *98<br>-91 *811<br>(-95) *731<br>⋮ *916<br>⋮ -826<br>-95<br>*91<br>*96 *741<br>(-98) *97<br>⋮ -731 -741<br>-98<br>(-811)<br>⋮<br>-811 | GROUP SELECTION CODE | *101 *1051 *13H5<br>*13K5<br>⋮<br>-13AS5<br>-13H5<br>-13K5<br>*1431<br>*1021 *1022<br>*106<br>*105 *107 *108<br>-101<br>(-105) *1131<br>⋮ *1014<br>⋮<br>-105<br>*101<br>-106 *1141<br>(-108) -107<br>⋮ -1131) -1141<br>-108<br><br><br><br>-101<br>*102 *1131 |
| -91<br>*92 *731<br>*811 | POINT SELECTION CODE | *101<br>(-102) *1141<br>⋮ *103<br>⋮ *104 *1024<br>-102<br>*1226<br>*12T1 -1024<br>*1015<br>-1131 -1141<br>-103<br>-104 -1226<br>*106<br>*105 *107 *108<br>-101<br>(-105) *1131 |
| *91<br>*741<br>-91 *93<br>*732 *94 | | -105<br>*101<br>*105 *1141<br>-101<br>(-105) *1132 |
| *91<br>*742<br>-91 -731 -741<br>*733 | | -105<br>*101<br>*105 *1142<br>-101 -1131 -1141<br>(-105) *1133 |
| *91<br>*743<br>-91 -732 -742<br>*734 | | -105<br>*101<br>*105 *1143<br>-101 -1132 -1142<br>(-105) *1134 |
| *91<br>*741<br>-91 -733 -743<br>*735 | | -105<br>*101<br>*105 *1141<br>-101 -1133 -1143<br>(-105) *1135<br>⋮ *1017 |
| *91<br>(-102) *742<br>⋮ -734 -741<br>-102<br>*828 (-811)<br>*3A5<br>*918 *3F5<br>-735 -742 *231<br>-93 -811 | | -105<br>*101<br>-106 *1142<br>(-108) -107 -1134<br>-1141<br>-1135 -1142<br>-108 |

| Control Location | Line | Remote Location |
|---|---|---|
| -94<br>*96<br>*95 *97 *98<br>-91<br>(-95) *731 | POINT CHECK CODE | -101<br>*102 *1131 |
| -95<br>*91<br>*95 *741<br>-91<br>(-95) *732 | | *101<br>*1141<br>-101 *103<br>*732 *104 *1024 |
| -95<br>*91<br>*95 *742<br>-91 -731 -741<br>(-95) *733 | | *101<br>*1142<br>-101 -1131 -1141<br>*1133 |
| -95<br>*91<br>*95 *743<br>-91 -732 -742<br>(-95) *734 | | *101<br>*1143<br>-101 -1132 -1142<br>*1134 |
| -95<br>*91<br>*95 *741<br>-91 -733 -743<br>(-95) *735<br>*919<br>-828 | | *101<br>*1141<br>-101 -1133 -1143<br>*1135 |
| -95<br>*91<br>*96 *742<br>(-98) -97 -734 -741<br>-735 -742<br>-98<br>(-811) | | *101<br>(-102) *1142<br>-1134 -1141<br>-102<br>*1228<br>*13G5 -1024<br>*1018 *1046 *1149<br>-1135 -1142<br>-103<br>-104 -1228<br>*106<br>*105 *107 *108 |
| -811 | | -101<br>(-105) *1131 |
| -91<br>*92 *731<br>*811 | SUPERVISION CODE | -105<br>*101<br>*105 *1141<br>-101<br>(-105) *1132 |
| *91<br>*741<br>-91 *93<br>*732 *94 | | -105<br>*101<br>*105 *1142<br>-101 -1131 -1141<br>(-105) *1133<br>*1047<br>*13K5<br>-105 -1431 |
| *91<br>*742<br>-91 -731 -741<br>*733 | | -101<br>-106 *1143<br>(-108) -107 -1132<br>-1142<br>-1133 -1143<br>-108 |
| *91<br>(-92) *743<br>⋮ -732 -742 | | |
| -92<br>(-811) *730<br>*553<br>*557<br>*3B5 *3C5 -3D5<br>*710<br>-811 -Red Lamp No. 5<br>*2AB<br>*758 *548<br>*759 *3F5 *950 -557<br>(-758) *760 *95 -231<br>-91 *Green Lamp No. 5<br>(-951) *2AL<br>-758<br>(-759)<br>-951<br>(-950) -915 -916<br>-918 -919<br>-923 -730<br>-733<br>-759 -743 -548<br>-553<br>*758-760 -6T1 -5A5<br>-2NL<br>*759 -950 -GreenLamp No. 5 | RESET CODE | -101<br>(-1051) *1131 *102<br>-1051<br>*1010 -1014 -1015<br>-1017 -1018<br>*1052 -1021 -1022<br>-1131 -1046<br>(-102) -1047 -1149<br>-12T1 -13G5<br>-102 |

| Control Location | Line | Remote Location |
|---|---|---|
| (-758) (-95) (-812) *760 -2AL *Green Lamp No. 5 *2AL | | |
| -95 | | |
| *758 *91 -812 | | |
| (-759) *951 (-813) | | *101 |
| | | *1051 |
| | | (-1010) |
| -759 -813 | | |
| *758 -760 (-237) | | |
| *759 : -Green Lamp No. 5 | | -1010 |
| (-758) *760 : -2AL | | (-1052) |
| : *Green Lamp No. 5 | | |
| -237 *2AL | | |
| (-238) | | |
| -758 | | -1052 |
| -238 | | |

The equipment is now at rest with the alarm lamp 2AL and green lamp No. 5 flashing and the alarm bell 2AB ringing, thereby signifying that the apparatus unit, in this instance a blower, on point 5 has stopped.

In order to stop the flashing of the lamps and to silence the alarm the alarm key 2AK is operated and the following action ensues:

| Control Location | Line | Remote Location |
|---|---|---|
| *2AK | | |
| (-710) -3B5 | | |
| (-758) *Green Lamp No 5 | | |
| -758 | | |
| (-759) | | |
| -759 | | |
| -760 | | |

Line supervision

When the equipment is in the normal or at rest position, and no codes are being transmitted between the locations, the line interconnecting them is energized by the 48 volt battery at the remote location. The line relay 91 at the control location, and the line relay 101 at the remote location are normally energized. For the transmission of codes, these relays are released momentarily. If the line interconnecting the control and remote locations should become open circuited or short circuited, the line relay 91 at the control location will drop. When line relay 91 has been dropped for approximately one second, the equipment will recognize that its dropping has not been caused by impulsing. The line alarm lamp 2LAL will be lighted and the alarm bell 2AB will ring. The manner in which this is accomplished may be set forth as follows:

| Control Location | Line | Remote Location |
|---|---|---|
| *91 *920 *951 | | *101 |
| Line L1—L2 is either open circuited or short circuited. | | |
| -91 | | |
| *92 *731 (-951) | | |
| *923 *811 | | |
| *812 | | |
| *813 | | |
| *237 | | |
| *238 | | |
| -951 | | |
| (-92) -731 -923 | | |
| -92 | | |
| (-811) | | |

| Control Location | Line | Remote Location |
|---|---|---|
| -811 | | |
| (-812) | | |
| -812 | | |
| (-813) | | |
| -813 | | |
| (-237) | | |
| -237 | | |
| (-238) | | |
| -238 | | |
| *239 | | |
| *2LAL *2AB | | |
| The alarm bell 2AB is silenced by operating the alarm key 2AK. | | |
| *2AK | | |
| *240 | | |
| -2AB | | |

The alarm lamp 2LAL will remain lighted and line supervision alarm relays 239 and 240 will remain energized until line relay 91 again is energized.

Temporary loss of battery at control location

If the 48 volt direct current source fails at the control location for some reason, all of the relays at this location are deenergized except line relay 91, which it will be recalled is energized from the direct current source at the remote location.

When the 48 volt direct current source is restored, reset control relay 950 will be energized, since battery supervision relay 920 is deenergized. This will cause the apparatus at the control location to transmit a reset impulse which will reset the equipment at the remote location.

Since all of the point code and start relays 1F2, etc., are deenergized, the equipment will start automatically and select each supervisory control point in turn. On the points where an apparatus unit is controlled, the operation code transmitted will depend on the position of the control key on that particular point. After the supervision code is received, the correct lamp indication will be set up and the point code and start relay restored to the normal energized position. On the point where supervision only is provided, a check code of one impulse will be transmitted. When the supervision code is received, the correct lamp indication will be set up, and the point code and start relay restored to the normal energized position.

Temporary loss of battery at remote location

If the 48 volt battery supply at the remote location fails for some reason, all of the relays at this location are deenergized. In addition, line relay 91 and reset relay 951 at the control location also are deenergized. As a result, the operator at the control location receives the same alarm that is given on the occurrence of open circuiting or short circuiting of the line as previously described.

When the 48 volt source is restored at the remote location, relays 91 and 951 at the control location, and relays 101 and 1051 at the remote location will be energized. Since all of the point code and start relays 13K2, etc., are deenergized, the equipment will start automatically to select each supervisory control point in turn, and transmit a supervision code corresponding to the position of the valve and the preset relay. However, it should be noted that all of the preset relays 13J2, etc., will have been deenergized, and will remain deenergized, when the 48 volt battery is restored. Therefore, all of the preset relays will be in the preset to open position.

If a valve had been in the open position or in the closed but preset to open position, the lamp indication at the control location will be the same as it was before the battery failed. However, if the valve had been in the close position, both the white and the green indicating lamps are now lighted to indicate that the valve is in the closed but preset to open position, despite the fact that the control key at the control location for this valve is in the closed position. Also, if a valve had been open but preset to close, the red lamp only is now lighted, indicating that the valve is no longer preset.

In order to restore any preset relay which has changed position as a result of the loss of the battery at the remote location, the operator should momentarily turn the control key for that valve to the other position, and then return it to its original position. This will cause the equipment to select that point and restore the preset relay to its original position. Although some of the preset relays will change positions as a result of losing the control power or the battery at the remote location, the white lamps at the control location will always indicate the actual position of the preset relays after the battery has been restored at the remote location.

Since certain changes can be made in the system described hereinbefore and shown in the accompanying drawings without departing from the spirit and scope of the invention, it is intended that all matters shown in the accompanying drawings and set forth hereinbefore will be interpreted as illustrative and not in a limiting sense.

I claim as my invention:

1. In a remote control and signalling sytem operating between a control location and a remote location over a control and signalling circuit interconnecting said locations at each of which is located a relay chain and means for transferring each chain from one function to another so as to use said chains and said circuit for selecting by successive operations of said chains in synchronism an apparatus unit at said remote location and checking and indicating said selection of said control location; in combination, a preset relay at said remote location individual to each apparatus unit for presetting the same to operate from one position to the other, a control key at said control location individual to each apparatus unit for initiating operation of said relay chains to operate the corresponding preset relay, supervision code control relays at said remote location operable after a preset relay has been operated to stop the operation of said relay chains on completion of the transmission of the number of impulses of the supervision code corresponding to the positions of said preset relay and associated apparatus unit, a supervision control relay at said control location operable on completion of the receipt of the supervision code, indication control relays at said control location operable in response to operation of said supervision control relay and in accordance with the number of impulses of said supervision code, an indicating lamp at said control locations individual to each position of each apparatus unit, and a preset lamp at said control location individual to each preset relay, the lighting of said indicating and preset lamps being controlled by said indication control relays to indicate the position of the associated apparatus unit or its position and the position of said preset relay as the case may be.

2. In a remote control and signalling system operating between a control location and a remote location over a control and signalling circuit interconnecting said locations at each of which is located a relay chain and means for transferring each chain from one function to another so as to use said chains and said circuit for selecting by successive operations of said chains in synchronism an apparatus unit of said remote location and checking and indicating said selection of said control location; in combination, means at said control location individual to each apparatus unit for initiating operation of said relay chains to preset a plurality of said apparatus units at said remote location to operate from one position to another, a preset lamp at said control location individual to each apparatus unit, means for energizing said preset lamp by operation of said relay chains, means at said remote location for initiating the operation of said relay chains on the presetting of the apparatus unit corresponding to said preset lamp to operate said energizing means and light said preset lamp thereby indicating that the corresponding apparatus unit is preset to operate to its other position, and means at said control location for initiating operation of said relay chains to effect simultaneous operation of said preset apparatus units to the other positions thereof.

3. In a remote control and signalling system operating between a control location and a remote location over a control and signalling circuit interconnecting said locations at each of which is located a relay chain and means for transferring each chain from one function to another so as to use said chains and said circuit for selecting by successive operations of said chains in synchronism an apparatus unit of said remote location and checking and indicating said selection of said control location; in combination, means at said control location individual to each apparatus unit for initiating operation of said relay chains to preset a plurality of said apparatus units at said remote location to operate from one position to another, an indicating lamp at said control location individual to each position of each apparatus unit, means for energizing said indicating lamps at said control location, means for initiating operation of said relay chains on the operation of the corresponding apparatus unit from one position to the other to operate said energizing means and light the indicating lamp corresponding thereto, a preset lamp at said control location individual to each apparatus unit, means for energizing said preset lamp by operation of said relay chains, means at said control location for initiating the operation of said relay chains on the presetting of an apparatus unit corresponding to said preset lamp to operate the last named energizing means and light said preset lamp, the lighting of an indicating lamp and the associated preset lamp indicating that the apparatus unit individual thereto occupies the position corresponding to the lighted indicating lamp and is preset to be operated to the other position, and means at said control location for initiating operation of said relay chains to effect simultaneous operation of said preset apparatus units to the other positions thereof.

4. In a remote control and signalling system operating between a control location and a remote location over a control and signalling circuit interconnecting said locations at each of which is located a relay chain and means for transferring each chain from one function to another so as to use said chains and said circuit for selecting by successive operations of said chains in synchronism an apparatus unit of said remote location and checking and indicating said selection of said control location; in combination, means at said control location individual to each apparatus unit for initiating operation of said relay chains to preset a plurality of said apparatus units at said remote location to operate from one position to another, an indicating lamp at said control location individual to each position of each apparatus unit, means for energizing said indicating lamp by operation of said relay chains, means at said remote location for initiating operation of said relay chains on the operation of the corresponding apparatus unit from one position to the other to operate said energizing means and light the indicating lamp corresponding thereto, means for maintaining lighted the indicating lamp corresponding to the position of said apparatus unit away from which the same moves in response to a control operation initiated from said control location, means for lighting the indicating lamp corresponding to the position to which said apparatus unit is moving on movement thereof to indicate the same, means for extinguishing said indicating lamp corresponding to said position of said apparatus unit away from which the same moves on completion of its movement to its other position, and means at said control location for initiating operation of said relay chains to effect simultaneous operation of said preset apparatus units to the other positions thereof.

5. In a remote control and signalling system operating between a control location and a remote location over a control and signalling circuit interconnecting said locations at each of which is located a relay chain and means for transferring each chain from one function to another so as to use said chains and said circuit for selecting by successive operations of said chains in synchronism an apparatus unit of said remote location and checking and indicating said selection of said control location; in combination, means at said control location individual to each apparatus unit for initiating operation of said relay chains to preset a plurality of said apparatus units at said remote location to operate from one position to another, an indicating lamp at said control location individual to each position of each apparatus unit, means for energizing said indicating lamp by operation of said relay chains, means at said remote location for initiating operation of said relay chains on the operation of the corresponding apparatus unit from one position to the other to operate said energizing means and light the indicating lamp corresponding thereto, a preset lamp at said control location individual to each apparatus unit, means for energizing said preset lamp by operation of said relay chains, means at said remote location for initiating the operation of said relay chains on the presetting of an apparatus unit corresponding to said preset lamp to operate the last named energizing means and light said preset lamp, the lighting of an indicating lamp and the associated preset lamp indicating that the apparatus unit individual thereto occupies the position corresponding to the lighted indicating lamp and is preset to be operated to the other position, means for maintaining lighted the indicating lamp corresponding to the position of said apparatus unit away from which the same moves in response to a control operation initiated from said control location, means for lighting the indicating lamp corresponding to the position to which said apparatus unit is moving on movement thereof to indicate the same, means for extinguishing said indicating lamp corresponding to said position of said apparatus unit away from which the same moves and said preset lamp on completion of the movement of said apparatus unit to its other position, and means at said control location for initiating operation of said relay chains to effect simultaneous operation of said preset apparatus units to the other positions thereof.

6. In a remote control and signalling system operating between a control location and a remote location over a control and signalling circuit interconnecting said locations at each of which is located a relay chain and means for transferring each chain from one function to another so as to use said chains and said circuit for selecting by successive operations of said chains in synchronism an apparatus unit of said remote location and checking and indicating said selection of said control location; in combination, means at said control location individual to each apparatus unit for initiating operation of said relay chains to preset a plurality of said apparatus units at said remote location to operate from one position to another, means at said control location for initiating operation of said relay chains to effect simultaneous operation of said preset apparatus units to the other positions thereof, timing means at said control location, means for starting said timing means on operation of the third named means to measure a time interval during which said apparatus units should complete their individual movements and report back same to said control location by operation of said relay chains, alarm means at said control location, and means controlled by said timing means for operating said alarm means in the event that any of said apparatus units fails to report completion of its movement within said time interval.

7. In a remote control and signalling system operating between a control location and a remote location over a control and signalling circuit interconnecting said locations at each of which is located a relay chain and means for transferring each chain from one function to another so as to use said chains and said circuit for selecting by successive operations of said chains in synchronism an apparatus unit of said remote location and checking and indicating said selection of said control location; in combination, means at said control location individual to each apparatus unit for initiating operation of said relay chains to preset a plurality of said apparatus units at said remote location to operate from one position to another, a preset lamp at said control location individual to each apparatus unit, means for energizing said preset lamp by operation of said relay chains, means at said remote location for initiating the operation of said relay chains on the presetting of the apparatus unit corresponding to said preset lamp to operate said energizing means and light said preset lamp thereby indicating that the corresponding apparatus unit is preset to operate to its other position, means at said control location for initiaing operaion of said relay chains to effect simultaneous operation of said preset apparatus units to the other positions thereof, timing means at said control location, means for starting said timing means on operation of the second named means to measure a time interval during which said apparatus units should complete their individual movements and report back same to said control location by operation of said relay chains, alarm means at said control location, means controlled by said timing means for operating said alarm means in the event that any of said apparatus units fails to report completion of its movement within said time interval, flasher means at said control location, means for operating said flasher means in the event that any of said apparatus units fails to report completion of its movement within said time interval, and means interconnecting said flasher means and the preset lamp individual to said apparatus unit failing to report to repeatedly energize and deenergize said preset lamp to indicate by its flashing the particular apparatus unit that has failed to report completion of its movement.

8. In a remote control and signalling system operating between a control location and a remote location over a control and signalling circuit interconnecting said locations at each of which is located a relay chain and means for transferring each chain from one function to another so as to use said chains and said circuit for selecting by successive operations of said chains in synchronism an apparatus unit of said remote location and checking and indicating said selection of said control location; in combination, means at said control location individual to each apparatus unit for initiating operation of said relay chains to preset a plurality of said apparatus units at said remote location to operate from one position to another, means at said control location for initiating operation of said relay chains to effect simultaneous operation of said preset apparatus units to the other positions thereof, means at said remote location for initiating operation of said relay chains on operation of an apparatus unit from one position to the other, alarm means at said control location rendered operable by said relay chains on operation thereof initiated by said means at said remote location, timing means at said control location, means for starting said timing means on operation of the second named means to measure a time interval during which said apparatus units should complete their individual movements and report back same to said control location by operation of said relay chains, and means at said control location controlled by said timing means to prevent operation of said alarm means on receipt of an indication that the position of an apparatus unit has changed in response to an operation initiated at said control location until the expiration of said time interval.

9. In a remote control and sgnalling system operating between a control location and a remote location over a control and signalling circuit interconnecting said locations at each of which is located a relay chain and means for transferring each chain from one function to another so as to use said chains and said circuit for selecting by successive operations of said chains in synchronism an apparatus unit of said remote location and checking and indicating said selection of said control location; in combination, means at said control location individual to each apparatus unit for initiating operation of said relay chains to preset a plurality of said apparatus units at said remote location to operate from one position to another, means at said control location for initiating operation of said relay chains to effect simultaneous operation of said preset apparatus units to the other positions thereof, means at said remote location for stopping the operation of said apparatus units that have been started to move from one position to the other, and means at said control location for initiating operation of said relay chains to operate said stopping means.

LEMUEL R. BREESE.

REFERENCES CITED

The following references are of record in the file of this patent:

UNITED STATES PATENTS

| Number | Name | Date |
|---|---|---|
| 1,607,868 | Chauveau | Nov. 23, 1926 |
| 2,091,301 | Boswau | Aug. 31, 1937 |
| 2,258,341 | Snavely | Oct. 7, 1941 |
| 2,389,204 | Ludi | Nov. 20, 1945 |
| 2,409,696 | Lewis | Oct. 22, 1946 |

FOREIGN PATENTS

| Number | Country | Date |
|---|---|---|
| 560,020 | France | Jan. 27, 1925 |